United States Patent
Sun et al.

(10) Patent No.: US 11,302,329 B1
(45) Date of Patent: Apr. 12, 2022

(54) ACOUSTIC EVENT DETECTION

(71) Applicant: Amazon Technologies, Inc., Seattle, WA (US)

(72) Inventors: Ming Sun, Winchester, MA (US); Spyridon Matsoukas, Hopkinton, MA (US); Venkata Naga Krishna Chaitanya Puvvada, Brighton, MA (US); Chao Wang, Newton, MA (US); Chieh-Chi Kao, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 16/914,589

(22) Filed: Jun. 29, 2020

(51) Int. Cl.
*G10L 15/22* (2006.01)
*G10L 15/08* (2006.01)

(52) U.S. Cl.
CPC ............. *G10L 15/22* (2013.01); *G10L 15/08* (2013.01); *G10L 2015/088* (2013.01)

(58) Field of Classification Search
CPC ................................ G10L 15/22; G10L 15/08
See application file for complete search history.

(56) References Cited

U.S. PATENT DOCUMENTS

| 10,418,957 | B1 | 9/2019 | Wang et al. |
| 2016/0371589 | A1* | 12/2016 | Golbandi ................. G06N 5/04 |
| 2018/0061404 | A1* | 3/2018 | Devaraj ................. G10L 15/22 |

OTHER PUBLICATIONS

The Examiner's attention is hereby drawn to the specification and file history of U.S. Appl. No. 16/023,923, titled "Audio Event Detection", filed Jun. 29, 2018, which may contain information relevant to the present application.
Victoria Song, "Alexa Can Now Alert You if Glass Breaks or Your Smoke Alarm Goes Off", GIZMODO, May 14, 2019. https://gizmodo.com/alexa-can-now-alert-you-if-glass-breaks-or-your-smoke-a-1834747615.
Eric Hal Schwartz, "Listen Learner from Apple and CMU Raises Entirely New Privacy Concerns for Voice Assistants", voicebot.ai, Apr. 27, 2020. https://voicebot.ai/2020/04/27/listen-learner-from-apple-and-cmu-raises-entirely-new-privacy-concerns-for-voice-assistants/.

* cited by examiner

*Primary Examiner* — Ibrahim Siddo
(74) *Attorney, Agent, or Firm* — Pierce Atwood LLP

(57) ABSTRACT

A system may include an acoustic event detection component for detecting acoustic events, which may be non-speech sounds. Upon detection of a command to detect a new sound, a device may prompt a user to cause occurrence of the sound one or more times. The acoustic event detection component may then be reconfigured, using audio data corresponding to the occurrences, to detect future occurrences of the event.

20 Claims, 17 Drawing Sheets

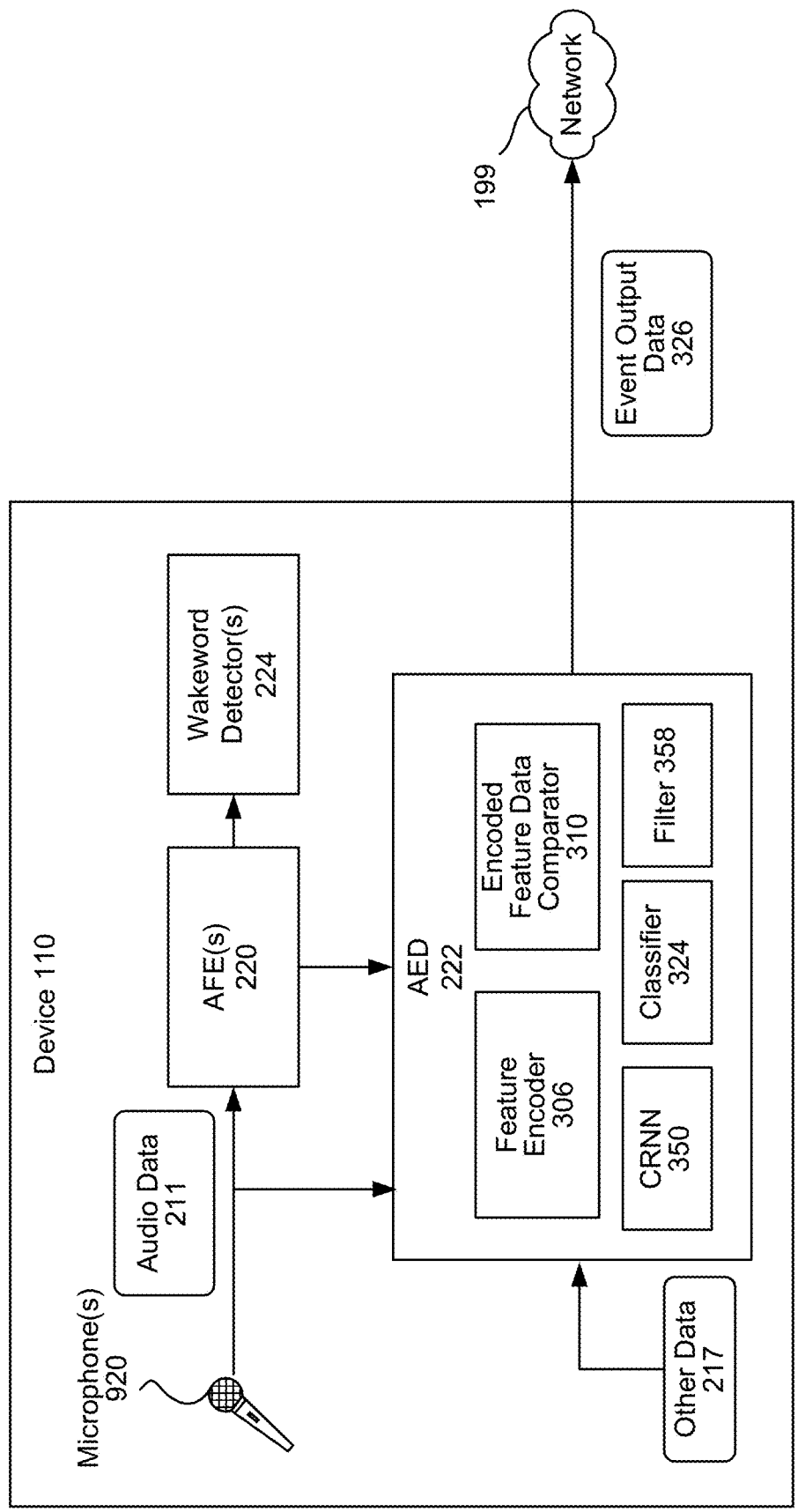

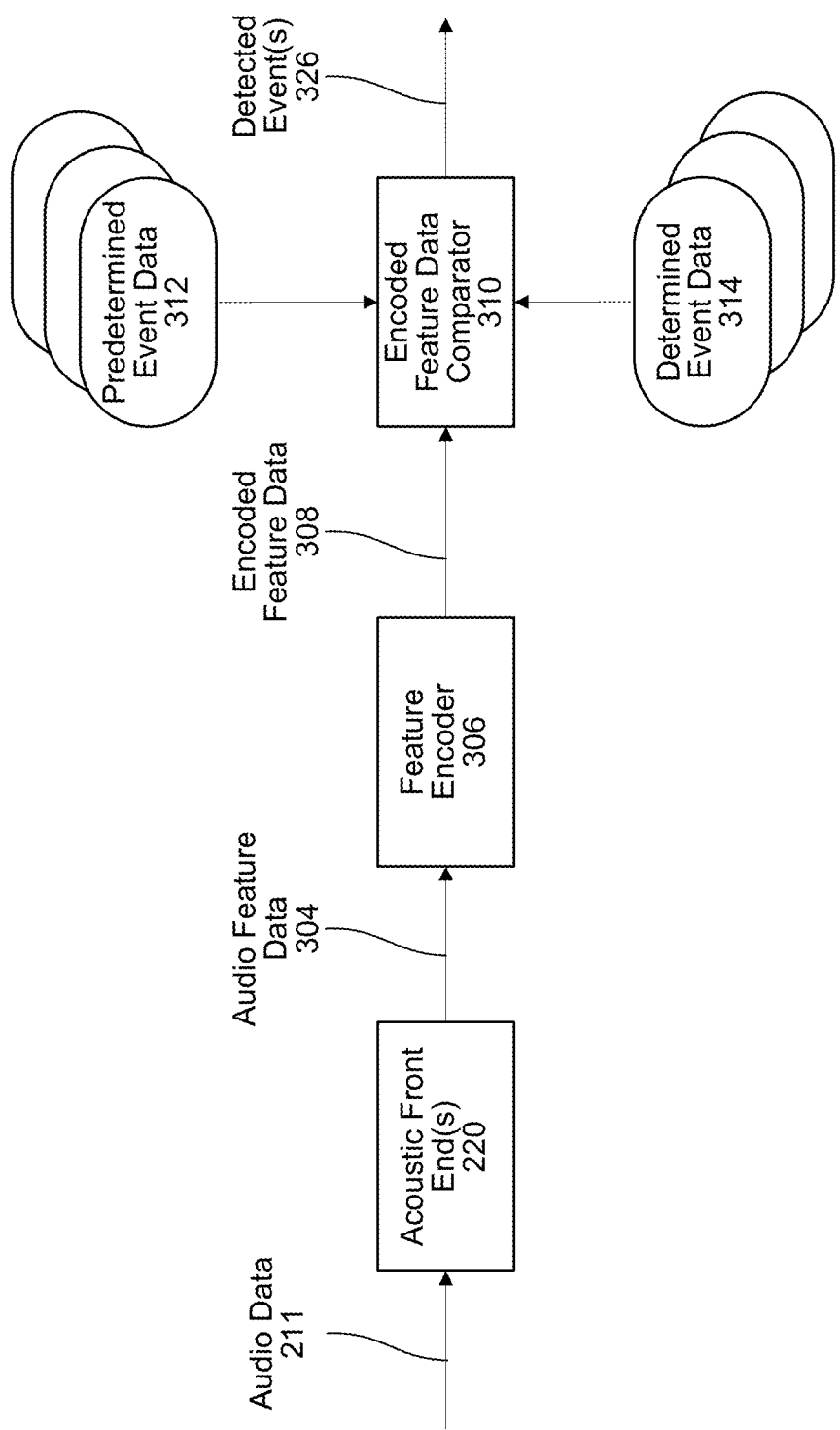

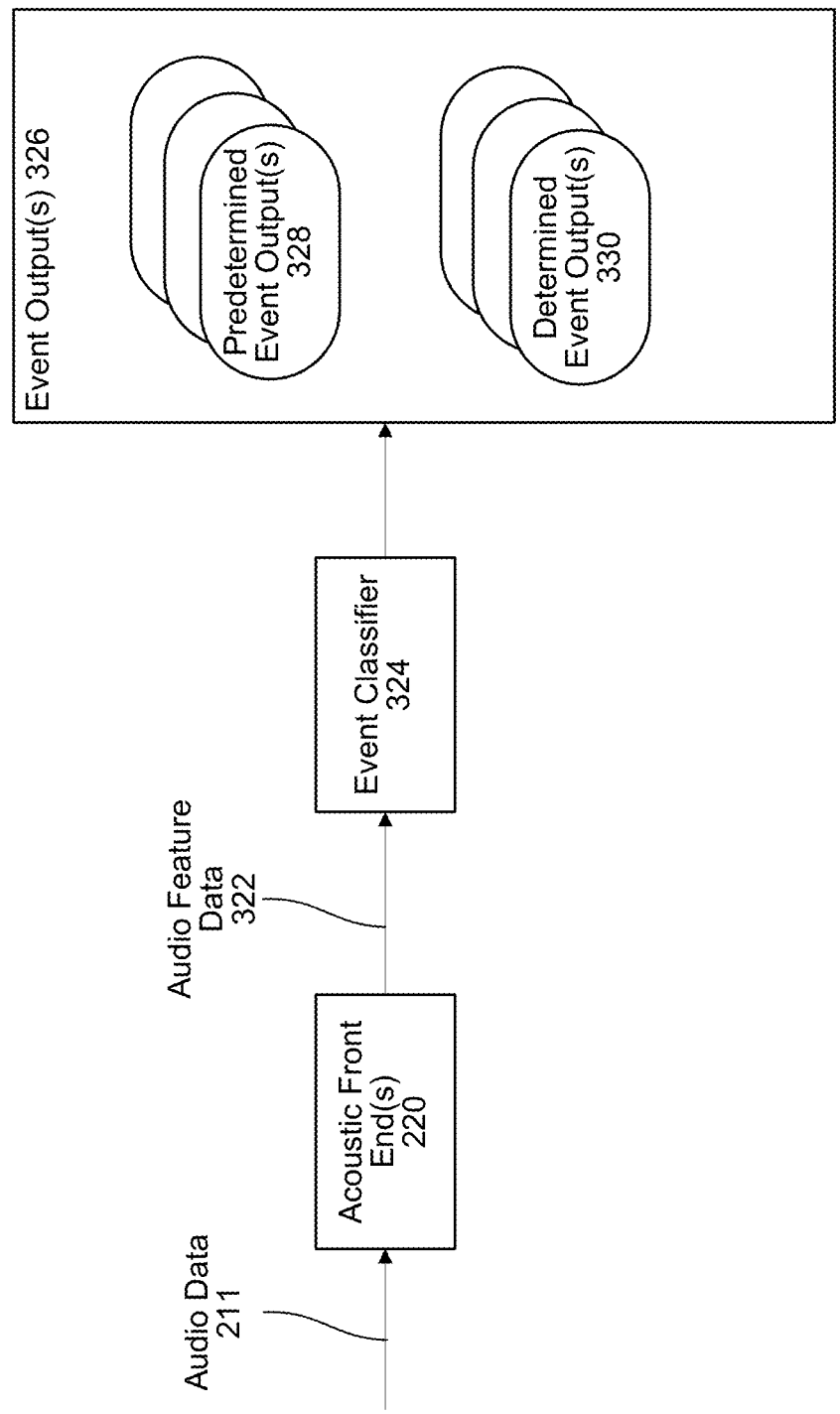

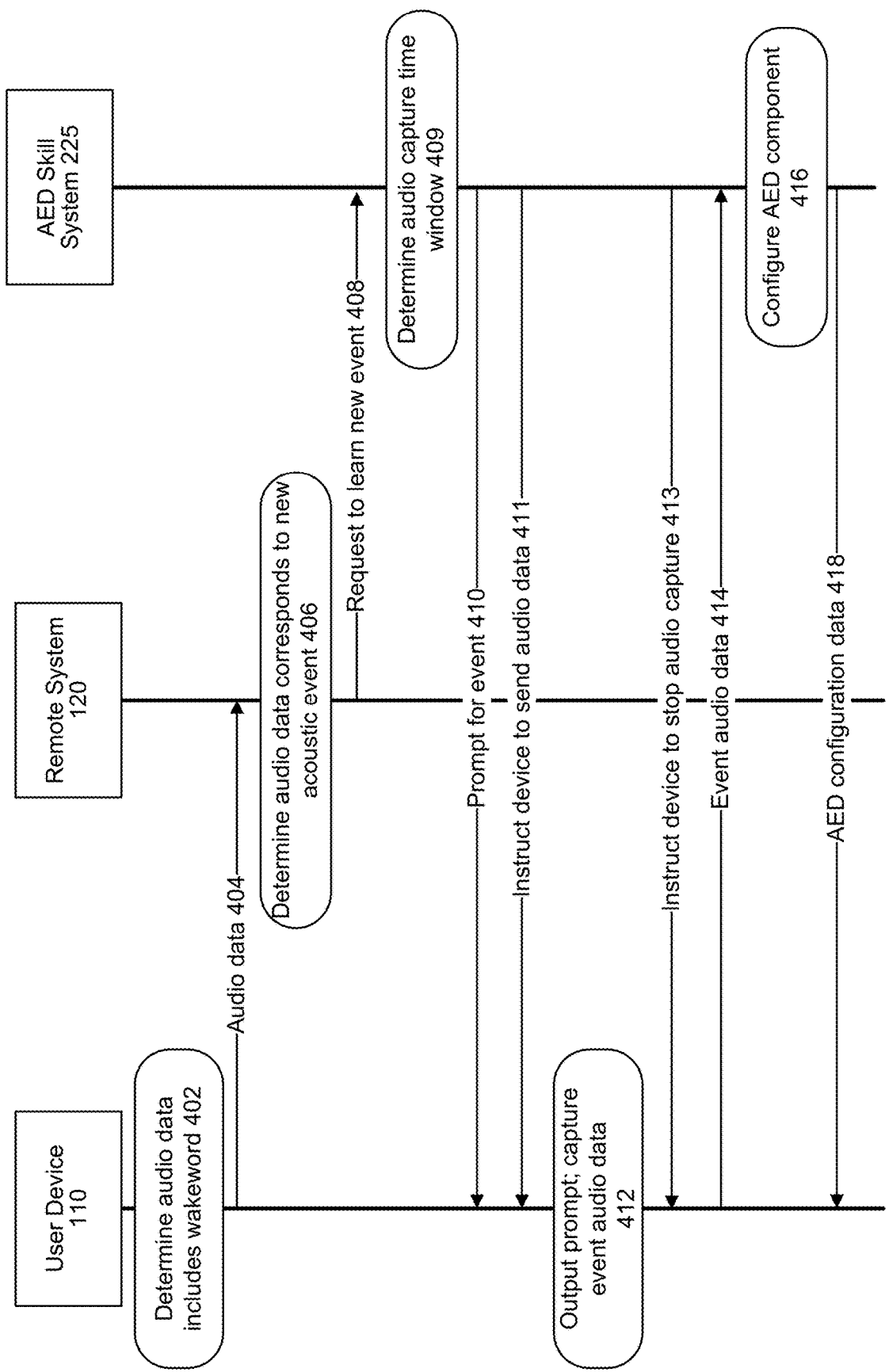

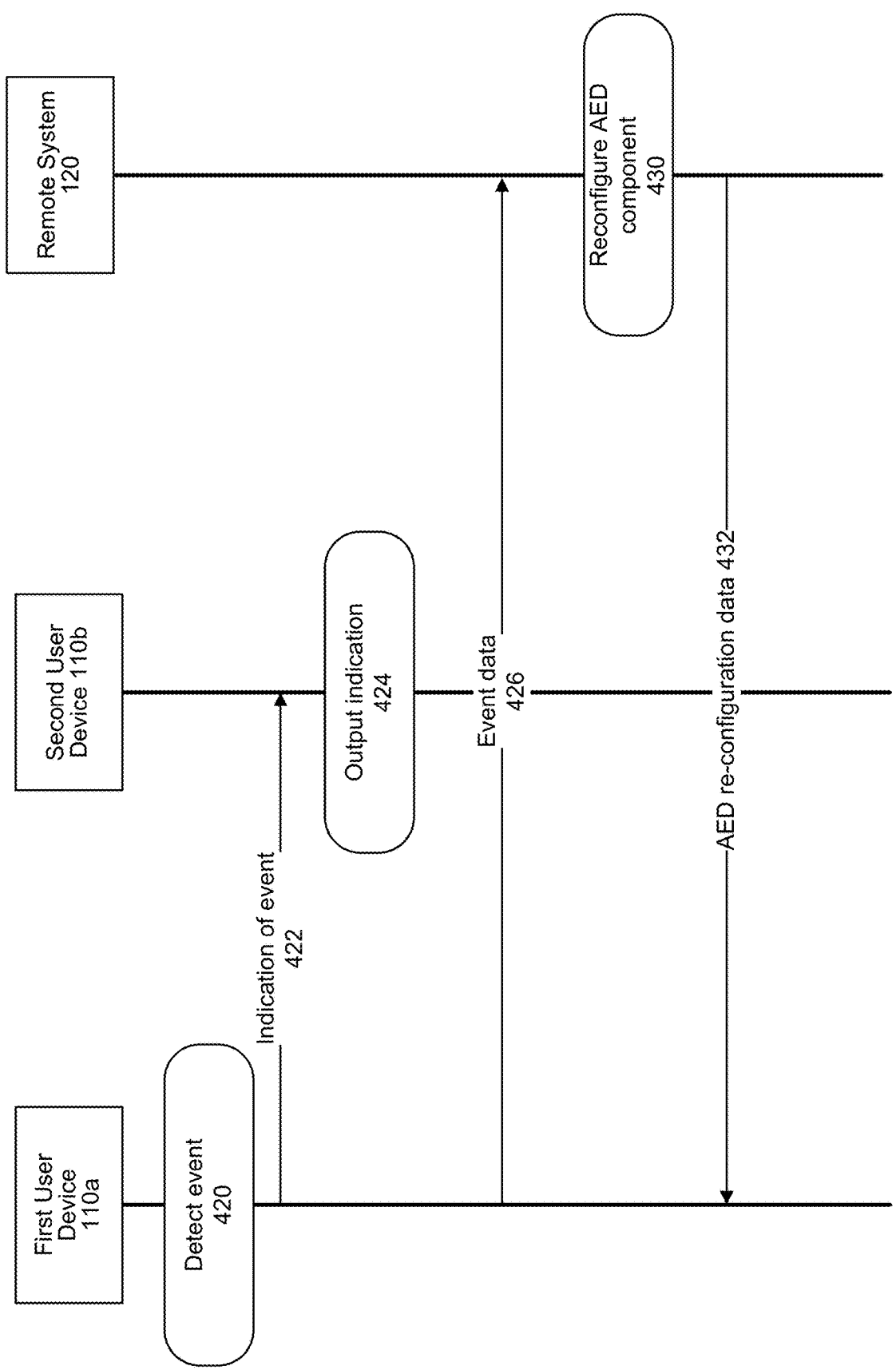

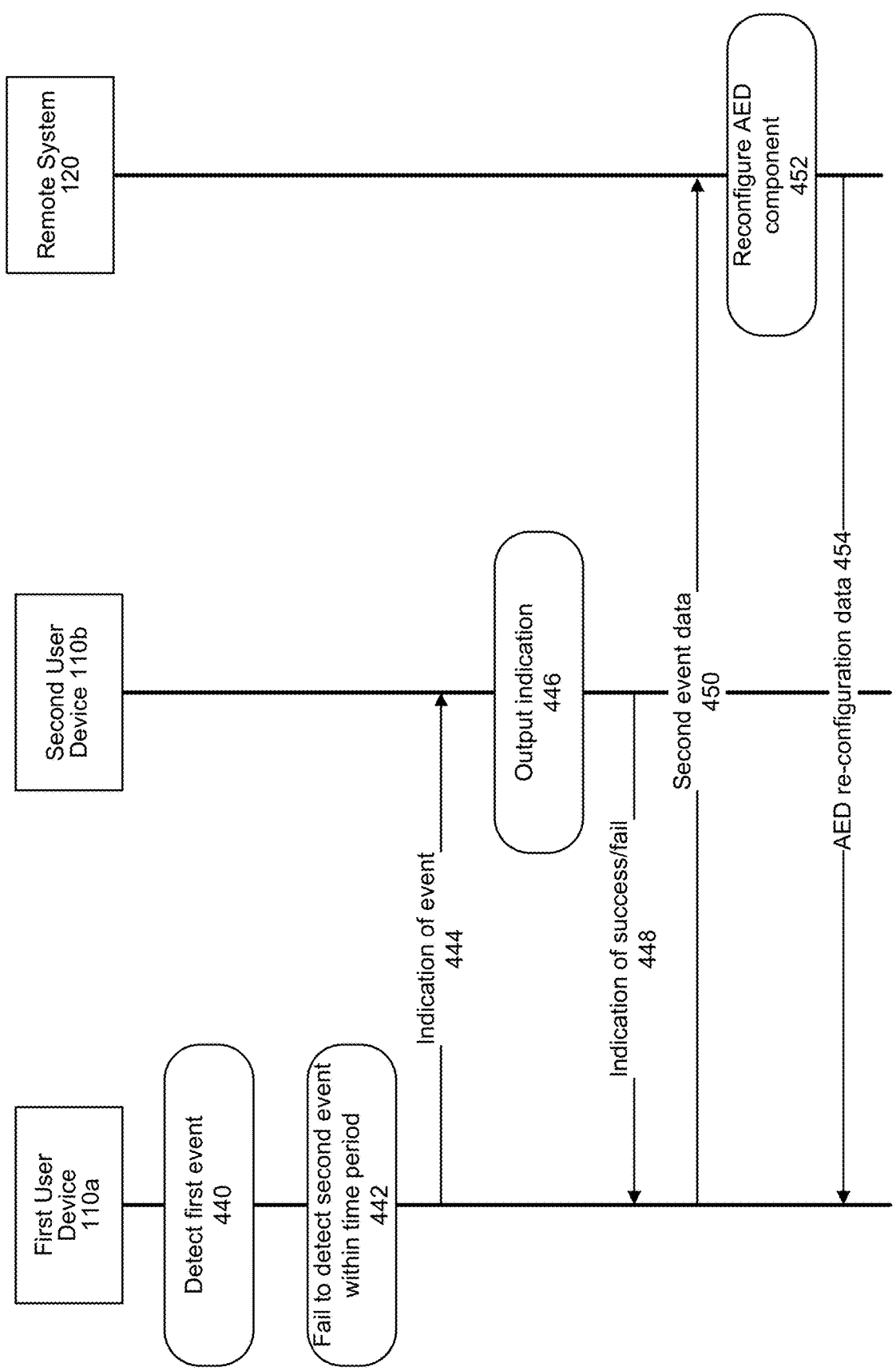

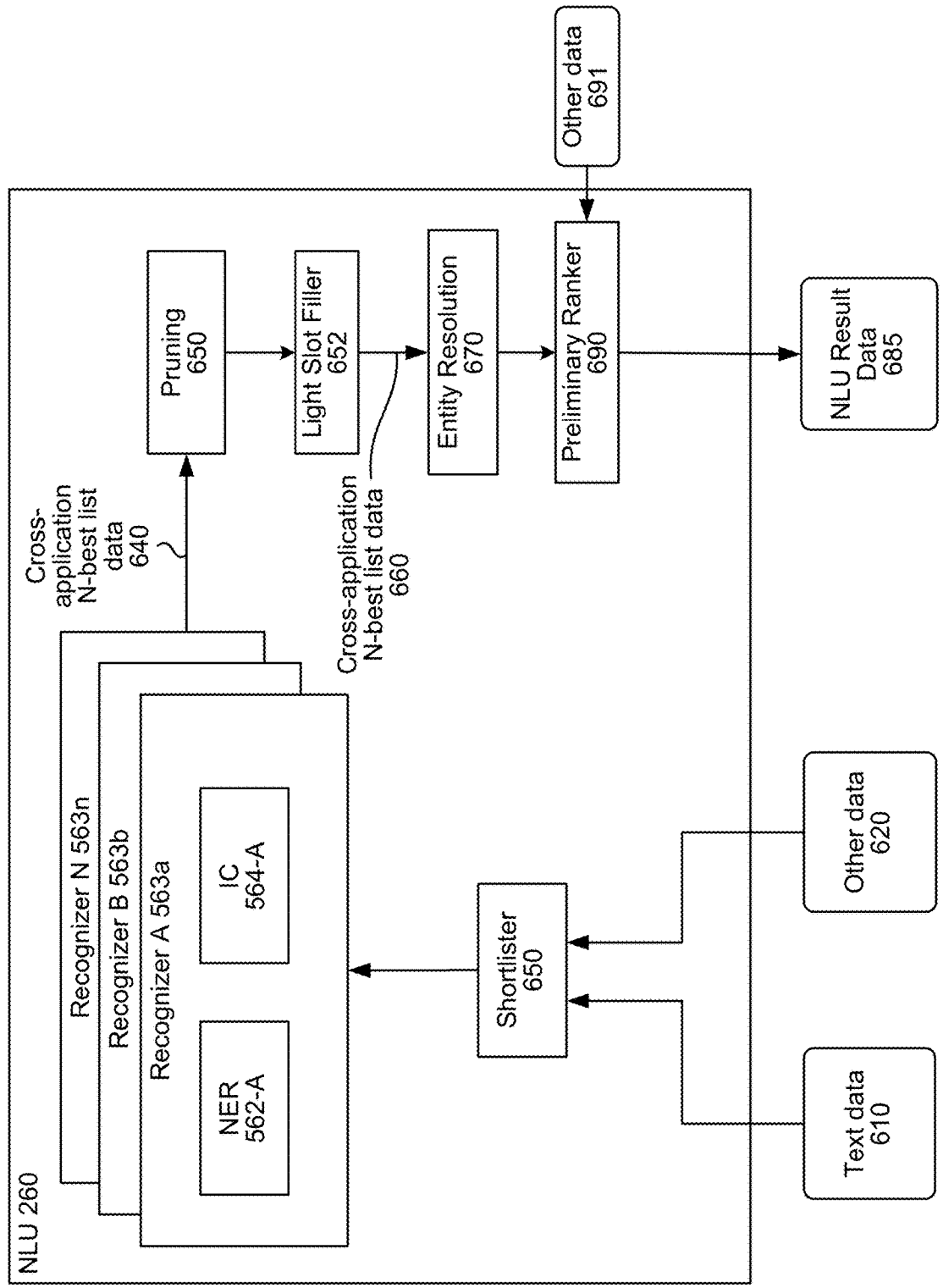

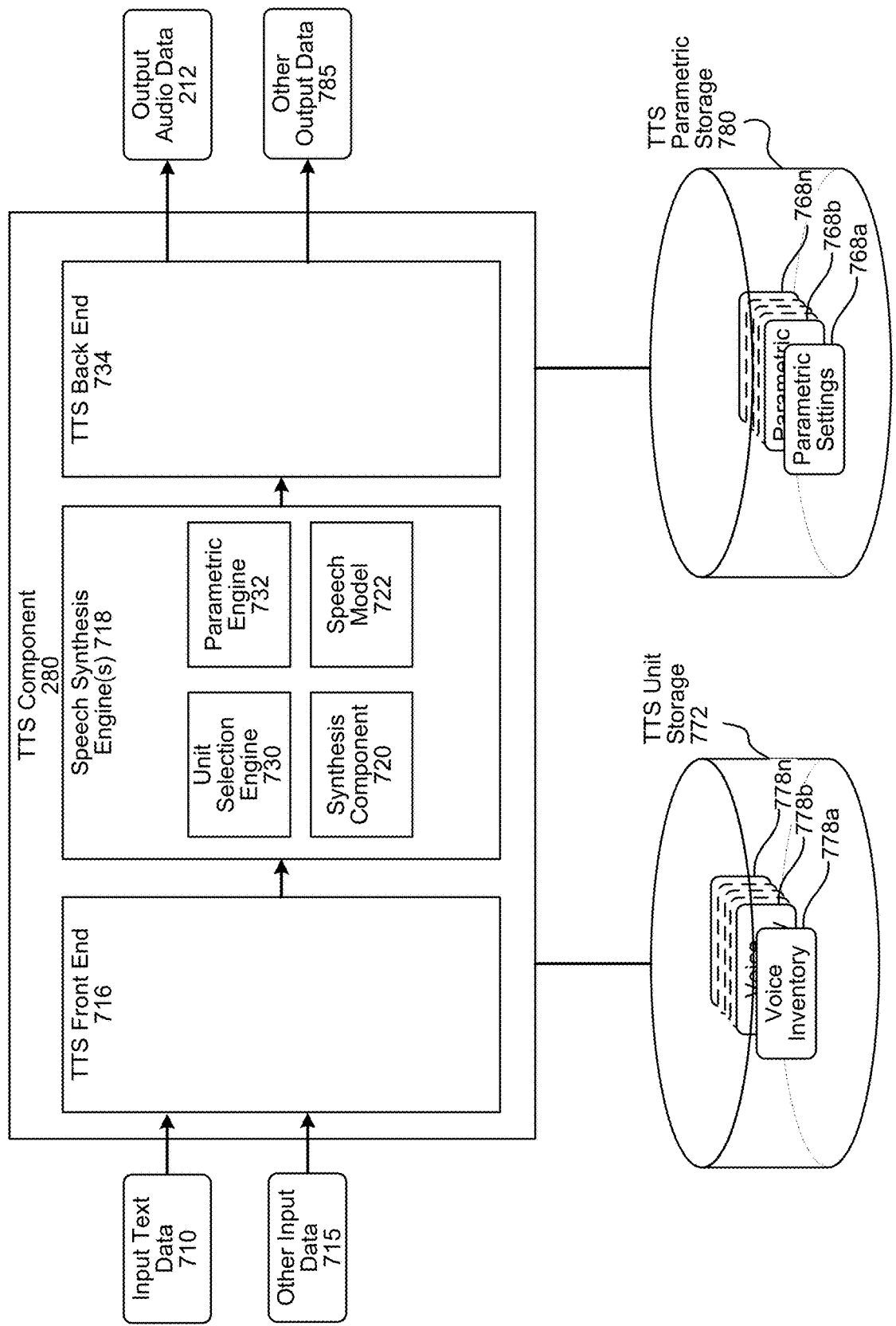

ACOUSTIC EVENT DETECTION

BACKGROUND

Computing devices may be configured to process sounds captured by a microphone and to take actions corresponding to the sound. The sounds may include non-speech events and/or human speech. An acoustic-event detector (AED) may be configured to recognize one or more non-speech sounds. A speech-processing system may allow a user to control computing devices using their speech. These systems identify words spoken by a user based on properties of received audio data that represents the speech of the user. Automatic speech-recognition (ASR) processing combined with natural-language understanding (NLU) processing allows a speech-processing system to determine text corresponding to the speech and to understand an intent expressed in the text. ASR processing and NLU processing may be combined with text-to-speech (TTS) processing, which may be used to generate synthesized speech responsive to the human speech. Acoustic-event detection and/or speech processing may be used by computers, hand-held devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIGS. 3A-3D illustrate AED components according to embodiments of the present disclosure.

FIGS. 4A, 4B, and 4C illustrate methods of using AED components according to embodiments of the present disclosure.

FIG. 6 illustrates components of a natural-language processing system according to embodiments of the present disclosure.

FIG. 7 illustrates text-to-speech processing components according to embodiments of the present disclosure.

DETAILED DESCRIPTION

Figure 1:
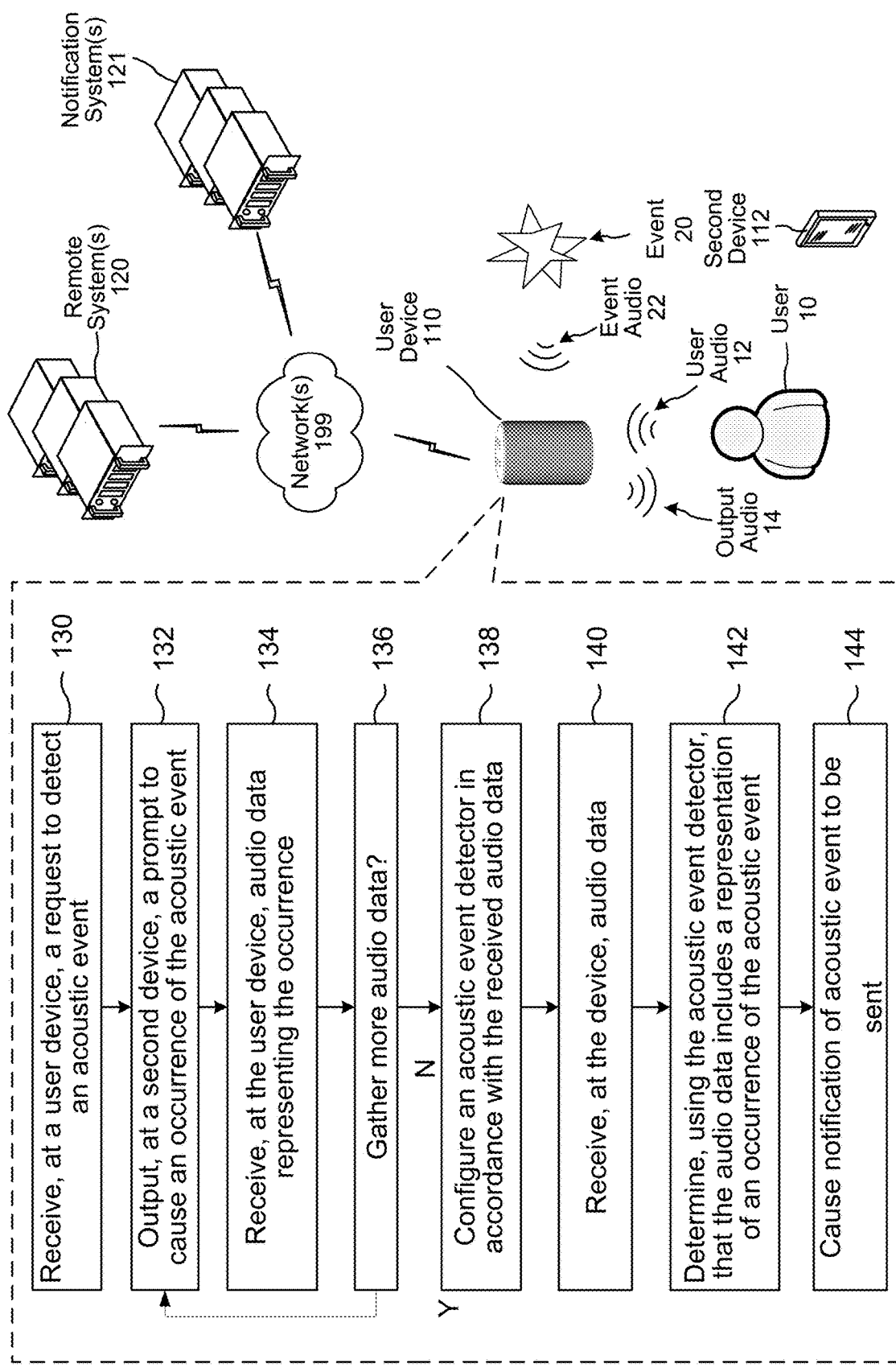
FIG. 1 illustrates a system configured to detect an acoustic event according to embodiments of the present disclosure.

Acoustic-event detection (AED) is a field of computer science and artificial intelligence that relates to processing audio data representing a sound, such as a non-speech sound, to determine when and if a particular acoustic event is represented in the audio data. Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Natural-language generation (NLG) is a field of computer science, artificial intelligence, and linguistics that relates to enabling computers to generate output text data responsive to input text data, such as a response to a command. Text-to-speech (TTS) is a field of computer science, artificial intelligence, and linguistics that relates to enabling computers to convert a representation of text into audio representing synthesized speech. ASR and/or NLU may be used together as part of a natural-understanding system. In various embodiments, the natural-understanding system may process data associated with an acoustic event (e.g., audio data that includes a representation of the event and/or event data generated by the AED system) and/or speech data associated with the event and may determine a corresponding output (e.g., sending a notification to a user device).

A user device and/or a remote system may be configured to process audio data to determine if properties of the audio data correspond to properties associated with an acoustic event. Example acoustic events include a doorbell ringing, a microwave oven beeping, a dog barking, and/or a window pane breaking. The user device may process the audio data in groups of samples, known as frames of audio data, to extract audio features from the audio data as it is received. The audio features may include, for example, Mel-frequency cepstrum coefficients of the audio data frames. An AED component may then process the audio features, which may be represented by a vector of N floating-point numbers. Example AED components may include a neural network configured as a hidden Markov model (HMM), support vector machine (SVM), and/or an audio feature encoder.

A voice-controlled user device and/or a remote system may be configured to receive a spoken user input and detect a wakeword and/or other text in the user input; determine a command in the user input; and provide a response to the command. A user may thus interact with the voice-controlled user device, another user device, and/or remote system by voice. In some embodiments, in response to the user device detecting the wakeword, the user device may perform speech processing on audio data representing the speech of the user, and/or send the audio data to the remote system for processing. The remote system may further process the audio data to verify that it includes a representation of the wakeword and/or to determine the command and/or response. The user device may then receive, from the remote device, output audio, video, or other data related to the response and/or other data required to perform an action associated with the response (e.g., a command to turn on a light).

An AED component may be trained, using training data representing various non-speech sounds, or otherwise be configured to detect a predetermined set of acoustic events. For example, the training data may include examples of various types of doorbells ringing, and if a user device that includes the AED component detects an acoustic event that resembles one of the types in the training data, the user device may indicate detection of the event and optionally output a response, such as sending data indicating occurrence of the event to a second user device, such as a smartphone.

The predetermined training data may, however, not include any or enough examples of a particular type of acoustic event and may thus not be able to detect certain acoustic events that fall outside the scope of the training data. For example, a user may configure a doorbell to play a custom sound when rung, such as a snippet from a particular song. A user device corresponding to the user may thus not detect an acoustic event when it hears the custom doorbell, despite being able to detect acoustic events corresponding to other types of doorbells. Further, the user of the user device may wish to have the device detect an acoustic event having a type (herein referred to as a "class") that the AED component is not capable of detecting. For example, the user device may be disposed in a kitchen, and the user may wish the device to detect the sound of a pot of water boiling over onto a stove. Still further, the user of the user device may wish the device to distinguish between similar acoustic events rather than perform a single action for multiple distinct events. For example, the user may have configured two doors, such as a front door and a side door, to have different types of doorbells and may wish that the AED component distinguish between, and take different actions based thereon, the different doorbell sounds.

The present disclosure relates to configuring an AED component to detect a sound selected by a user of a user device. The user may interact with the user device using the speech-processing techniques described herein and command the user device to learn a new sound with speech such as, "Alexa, I want to you learn a new sound." The user device and/or remote system may determine the intent of the user by processing corresponding audio data with the ASR and/or NLU techniques described herein. The user device and/or remote system may identify an AED skill component (described in greater detail below with respect to FIG. 2) configured to learn the new sound. The AED skill component may cause the user device (and/or other device) to output a prompt to cause occurrence of the acoustic event associated with the sound. The skill component and/or user device may further prompt the user to cause further occurrences of the acoustic event.

The user device may determine audio data representing the occurrence(s) and may configure an AED component using the audio data such that the AED component is configured to detect the new acoustic event. The user device, remote system, and/or other system may perform the configuration. In some embodiments, the AED component includes a classifier that is trained using the audio data to detect a new class of events corresponding to the acoustic event. In other embodiments, the AEC component includes an encoder that maps feature vectors representing the audio data to points in an embedding space. The user device may then process audio data using the re-trained classifier to detect the new events and/or encoder to determine when received audio, mapped to the embedding space, corresponds to the point determined from the prompted occurrences.

FIG. 1 illustrates a system configured to prompt for at least one example occurrence of an acoustic event, configure an AED component in accordance with the occurrences, and then process additional audio data to detect future occurrences of the event in accordance with the present disclosure. Although the figures and discussion of the present disclosure illustrate certain operational steps of the system in a particular order, the steps described may be performed in a different order (as well as certain steps removed or added) without departing from the intent of the disclosure. In various embodiments, a user device 110 such as smart speaker, a vehicle such as an automobile, or other such controlled device communicates with a remote system 120 using a network 199. While FIG. 1 illustrates a smart speaker as the user device 110, the disclosure is not limited thereto, and the systems and methods described herein may be implemented using other user devices 110, such as smartphones, tablet computers, personal computers, or other devices. The device 110 may receive user audio 12 from a user 10 and event audio 22 from an acoustic event 20. The device may further output audio 14.

The user device 110 receives (130), at a user device, a request to detect an acoustic event by the user device. As mentioned above, an example of such a request is, "Alexa, I want you to learn a new sound." As described in greater detail below, an environment may include multiple user devices, and the user device 110 selected to detect the event may be the user device closest to the source of the event or the user device that receives a highest-quality (e.g., highest signal-to-noise ratio signal) audio signal corresponding to the event.

The user device 110 may be an always-on device capable of continually detecting acoustic events. As such, the user device 110 may be powered using an AC power supply and may thus be difficult or impossible to move in an environment. In addition, the user 10 may wish the user device 110 to detect audio events in a first, preferred location, and not in a second location closer to the source of the event.

After issuing the request to detect the acoustic event, the user 10 may, however, be required to move in the environment in order to cause a sound corresponding to the acoustic event. While the sound of the event may be detected by the user device 110, the user 10 may not be close enough, when causing the sound, to receive audio or other output of the user device 110. The user device 110 (and/or remote system 120) may thus determine a second device 112, such as a cellular telephone, that corresponds to the user device 110 (e.g., a device that is associated with the same user account as the user device 110). The user 10 may thus transport the second device 112 to a location corresponding to a source of the sound of the acoustic event in lieu of transporting the user device 110.

The second device 112 may thus output (132) a prompt to cause an occurrence of the acoustic event. The prompt may be audio 14, visual, haptic (e.g., a vibration), or any other type of prompt. The second device 110 may receive additional audio corresponding to confirmation of receipt of the prompt. The user device 110 may then wait a period of time (e.g., five seconds) for the event to occur. If no event is detected, the second device 110 may output an additional prompt.

The user device 110 may receive (134) audio data representing the occurrence of the event. If the environment includes multiple user devices 110, each one may receive audio data representing occurrence of the event. Each item of audio data from each user device 110 may be evaluated to determine a quality value, and the user device 110 having the highest quality value may be selected for further processing. The quality metric may be, for example, a signal-to-noise ratio (SNR) of the audio data, a loudness of a sound represented in the audio data, or other such quality value. The audio data may also be evaluated (by the device or the system) to determine a value corresponding to the sufficiency of the audio data to provide reference data for an acoustic event detector (e.g., a value representing how good the audio sample will be for training purposes. The value may be based at least in part on various factors such as signal quality, signal length, the appearance of background interfering noise (e.g., speech, unwanted overlapping sound, etc.), number of iterations of the audio data, or the like.

The user device 110 may determine (136) if additional audio data representing additional occurrences of the acoustic event should be prompted for and received. In some embodiments, the user device 110 prompts for a fixed number of occurrences, such as two, three, five, or ten occurrences. In other embodiments, the received audio data is evaluated for its quality (e.g., SNR and/or loudness) and additional prompts are output if the quality satisfies a condition (e.g., is below a threshold). As explained in greater detail below, the user device 138 may output prompts for additional occurrences if it and/or the remote device 120 fails to configure the AED component to detect the new acoustic event.

When enough audio data is gathered, the user device 110 and/or remote system 120 configure (138) the AED component in accordance with the received data. As explained in greater detail below, a classifier of the AED component may be trained using the received audio data as training data (and, in some embodiments, using additional training data) to detect a new class corresponding to the acoustic event. In other embodiments, an encoder of the AED component is configured to detect when received audio data that is mapped to an embedding space corresponds to a point in the embedding space representing the acoustic event. If the remote system 120 (and/or other system) performs some or all of this configuration, it may send, to the user device 110, the corresponding points in the embedding space (as represented by one or more embedded feature vectors) and/or data corresponding to a re-trained classifier.

The device 110 may then receive (140) additional audio data and use the re-configured AED component to process the additional audio data and determine (142) that it includes a representation of another occurrence of the acoustic event. As described in greater detail below, upon detection of the event, the user device 110 may cause (144) a notification of an acoustic even to be sent. For example, the user device 110 may cause output of corresponding output data, such as sending an alert to a second user device, sending a message to emergency services, and/or opening a door. In one example the user device 110 may send a notification of the detected acoustic event to notification system(s) 121 which may cause a notification to be sent to (and/or cause an action to be performed by) another device, for example device 112 or a different device.

Figure 2:
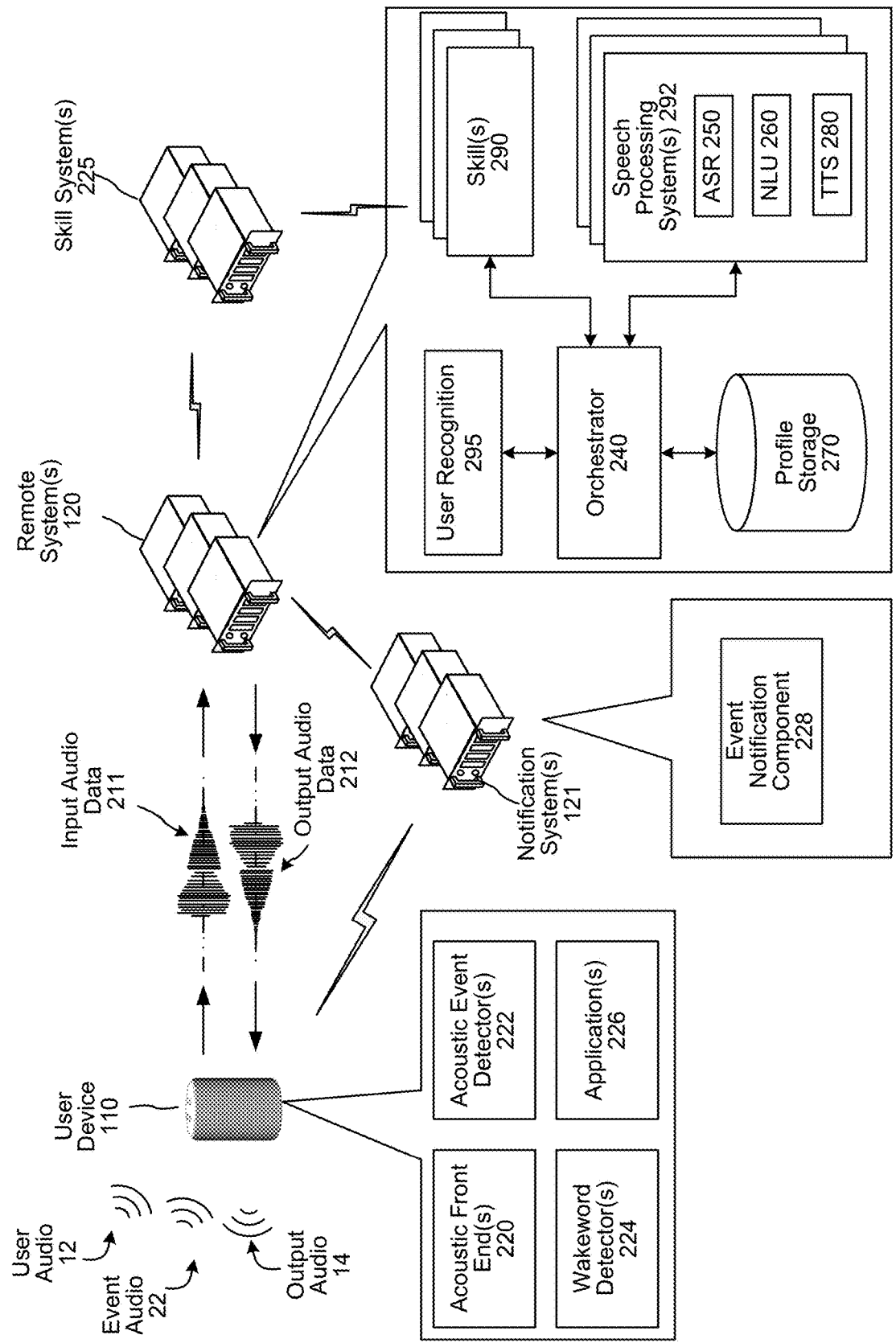
FIG. 2 illustrates a user device and a remote system configured for detecting an acoustic event and for speech processing according to embodiments of the present disclosure.

The system may operate using various components as described in FIG. 2. The various components may be located on same or different physical devices. For example, as shown in FIG. 2, some components may be disposed on a user device 110, while other components may be disposed on a remote system 120; however, some or all of the components may be disposed on the user device 110. Communication between various components may thus occur directly (via, e.g., a bus connection) or across a network(s) 199. As described in greater detail below, the user device 110 may include an acoustic front end (AFE) 220 for processing audio, one or more wakeword detectors 224 for detecting one or more wakewords, and/or one or more applications 226 for providing output and/or changing a state of the user device 110, such as illuminating a light. As illustrated, the wakeword detector 224 is disposed on the user device 110, while further speech-processing components (such as the NLU component 260) are disposed on the remote system 120. The present disclosure is not, however, limited to only this arrangement of components, and any other disposition of components is within the embodiments of the present disclosure. For example, some or all of the speech processing may be performed by the user device 110, and the user device 110 may thus not send any audio data 211 to the remote system 120.

An audio capture component(s), such as a microphone or array of microphones of the user device 110, captures input audio 12/22 and creates corresponding microphone data. The AFE 220 may process the microphone data using a number of techniques, such as determining frequency-domain audio data by using a transform such as an FFT and/or determining a Mel-cepstrum. The output of the AFE 220 may be or include acoustic feature data corresponding to a representation of the input audio data 211. As described in greater detail below, the user device 110 may receive output audio data 212 from the remote system 120 and cause output of audio corresponding to the output audio data 212.

The AFE 220 may process the microphone data to create acoustic feature data, which may include one or more acoustic-feature vectors such as LFBE vectors. Other types of feature vectors may be similarly created and used; for example, the feature vectors may include Mel-frequency cepstrum coefficients (MFCCs).

The AFE 220 may include an analysis filterbank that processes one or more frames audio data. The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges 406, wherein M may equal.

An energy estimation component may receive as input the frequency data, process it to determine one or more values that represent an estimated energy of the frequency data, and output corresponding acoustic feature data for each audio frame. If M acoustic features are extracted, the acoustic feature data may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filterbank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or in addition be represented by the acoustic feature data. The dimension of each acoustic feature vector of the acoustic feature data (which may be 20) may correspond to the number M of frequency bins (which may be 20).

The user device may include one or more AED components 222. The AED component 222 may receive audio data from a microphone or microphone array; this audio data may also be a digital representation of an analog audio signal and may be sampled at, for example, 256 kHz. The AED component may instead or in addition receive acoustic feature data, which may include one or more LFBE and/or MFCC vectors, from the acoustic front end 220 as described above. The acoustic front end 222 for the AED component 222 may differ from the AED component 222 for a wake-word detector 224 at least because the AED component 222 may require a context window greater in size that that of the WW detector 224. For example, the WW acoustic-feature data may correspond to one second of audio data, while the AED acoustic-feature data may correspond to ten seconds of audio data.

The AED component 222 may include an encoder that processes the acoustic feature data to determine encoded acoustic feature data. It may include one or more recurrent layer(s) that may process the acoustic-feature data to determine one or more probabilities that the audio data includes one or more representations of one or more acoustic events. The recurrent layer(s) may include a number of nodes arraigned in one or more layers. Each node may be a computational unit that has one or more weighted input connections, a transfer function that combines the inputs in some way, and an output connection. The recurrent layer(s) may include one or more recurrent nodes, such as LSTM nodes, or other recurrent nodes, such as gated rectified unit (GRU) noes. For example, the recurrent layer(s) may include 128 LSTM nodes; each LSTM node may receive one feature vector of the acoustic feature data during each frame. For next frames, the recurrent layer(s) may receive different sets of 128 feature vectors (which may have one or more feature vectors in common with previously-received sets of feature vectors—e.g., the sets may overlap). The recurrent layer(s) may periodically reset every, for example, 10 seconds. The model 708 may be reset when a time of running the model (e.g., a span of time spent processing audio data) is greater than a threshold time. Resetting of the recurrent layer(s) may ensure that the recurrent layer(s) does not deviate from the state to which it had been trained. Resetting the recurrent layer(s) may include reading values for nodes of the model—e.g., weights—from a computer memory and writing the values to the recurrent layer(s).

As described above, the recurrent layer(s) may be trained using ML techniques and training data. The training data may include audio samples of acoustic events under different conditions. The training data may further include representations of other events and annotation data indicating which events are of interest and which events are not of interest. The recurrent layer(s) may be trained by processing the training data, evaluating the accuracy of its response against the annotation data, and updating the recurrent layer(s) via, for example, gradient descent. The recurrent layer(s) may be deemed trained when it is able to predict occurrence of acoustic events of interest in non-training data within a required accuracy.

The recurrent layer(s), however implemented, may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% chance that the acoustic-feature data represents the acoustic event, 1.0 represents a 100% chance that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

The event classifier may be a classifier trained to distinguish between different acoustic events and other sounds. Examples of trained classifiers include support-vector machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories (e.g., acoustic event vs. non-acoustic event), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. The event classifier may output one or more event detection outputs, each of which may indicate a yes/no decision as to whether an associated acoustic event has occurred.

The user device 110 may instead or in addition process the input audio data 211 to determine whether speech is represented therein. The user device 110 may use various techniques to determine whether the input audio data 211 includes speech. In some examples, a voice-activity detector of the user device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative or qualitative aspects. In other examples, the user device 110 may include a classifier configured to distinguish speech from background noise. The classifier may be implemented by techniques such as linear classifiers, support vector machines, and decision trees. In still other examples, the user device user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 224 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 224 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected by the wakeword detector(s) 224, the user device 110 may begin transmitting the audio data 211 to the remote system(s) 120. The input audio data 211 may include data corresponding to the wakeword; in other embodiments, the portion of the audio corresponding to the wakeword is removed by the user device 110 prior to sending the input audio data 211 to the remote system(s) 120. In the case of touch input detection, for example, the input audio data 211 may not include a wakeword.

In various embodiments, the wakeword detector(s) 224 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the user device 110 may send the audio data 211 (and/or an indication of detection of the wakeword) to its corresponding speech-processing system.

In various embodiments, the wakeword-detection model of the wakeword detector(s) 224 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 224 may determine a similarity score for the candidate wakeword based on how similar it is to the stored wakeword; if the similarly score is higher than the wakeword-detection threshold, the wakeword detector 224 determines that the wakeword is present in the audio data, and if the similarity score is less than the wakeword-detection threshold, the wakeword detector 224 determines that the wakeword not is present in the audio data. For example, if the candidate wakeword matches the stored wakeword very closely, the wakeword detector 224 may determine a similarity score of 100; if the candidate wakeword does not match the stored wakeword at all, the wakeword detector 224 may determine a similarity score of 0. If the wakeword detector 224 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the system(s) 120 and/or upon determination by the user device 110, the input audio data 211 may be sent to an orchestrator component 240. The orchestrator component 240 may include memory and logic that enables it to transmit various pieces and forms of data to various components of the system, as well as perform other operations as described herein. The orchestrator component 240 may be or include a speech-processing system manager and/or one or more of the speech-processing systems 292, which may be used to determine which, if any, of the ASR 250, NLU 260, and/or TTS 280 components should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 to one or more of the speech-processing components 292 for processing.

In some embodiments, the orchestrator 240 and/or speech-processing system manager communicate with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing systems elected by the speech-processing system manager and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 may interpret the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

Figure 5:
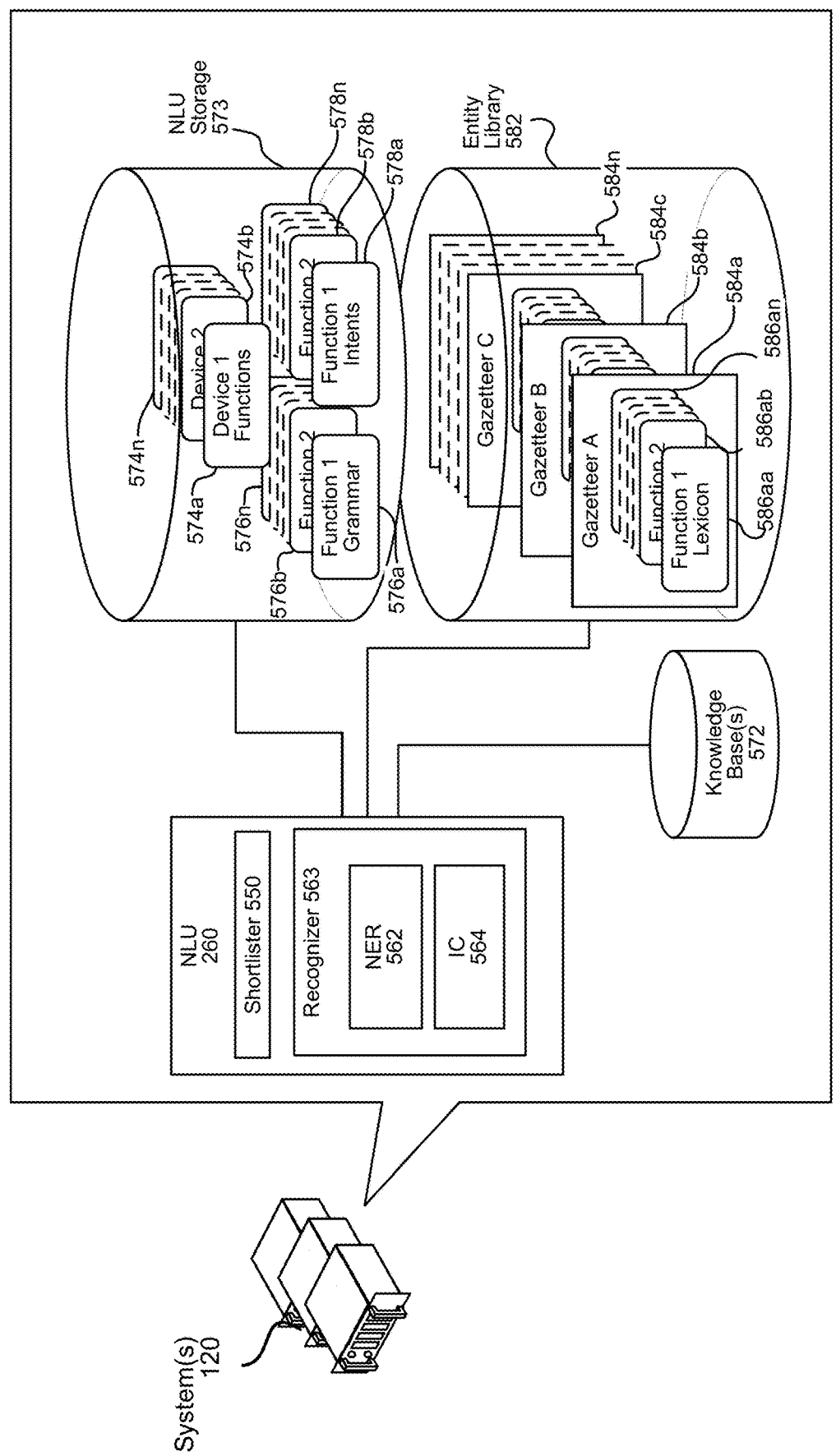
FIG. 5 illustrates a natural-language processing system according to embodiments of the present disclosure.

Each speech-processing system 292 may further include a NLU component 260, which is shown in greater detail in FIGS. 5 and 6, that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system(s) 120, a skill component 290, a skill system(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the user device 110. In another example, if the text data corresponds to "turn off the lights," the NLU component 260 may determine an intent that the system turn off lights associated with the user device 110 or the user 5.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. As described above, the NLU component 260 and/or skill component 290 may determine, using the interaction score, text data representing an indication of a handoff from one speech-processing system 292 to another.

A skill component 290 may be software running on the system(s) 120 that is, or is similar to, a software application. A skill component 290 may enable the system(s) 120 to execute specific functionality in order to provide data or produce some other requested output. One example of a skill component 290 is an AED skill component, as described herein, that causes output of prompts for occurrences of an acoustic event and coordinates reconfiguration of the AED component 222 in accordance with corresponding received audio data. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the user device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system(s) 120 directly and/or via the orchestrator component 240. A skill system(s) 225 may be configured to perform one or more actions. A skill may enable a skill system(s) 225 to execute specific functionality in order to provide data or perform some other action requested by a user. For example, a weather service skill may enable a skill service(s) 225 to provide weather information to the system(s) 120, a car service skill may enable a skill system(s) 225 to book a trip with respect to a taxi or ride sharing service, an order pizza skill may enable a skill system(s) 225 to order a pizza with respect to a restaurant's online ordering system, an AED skill component may re-configure the AED component 222, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 120 may include a skill component 290 dedicated to interacting with the skill system(s) 225. A skill, skill device, or skill component may include a skill component 290 operated by the system(s) 120 and/or skill operated by the skill system(s) 225.

The speech-processing system 292 may include a TTS component 280, which is shown in greater detail in FIG. 7, that generates audio data (e.g., synthesized speech) from text data using one or more different methods. Text data input to the TTS component 280 may come from a skill component 290, the orchestrator component 240, and/or another component of the system. The text data may include an indication of a speech-processing component and/or data responsive to a command.

Figure 8A:
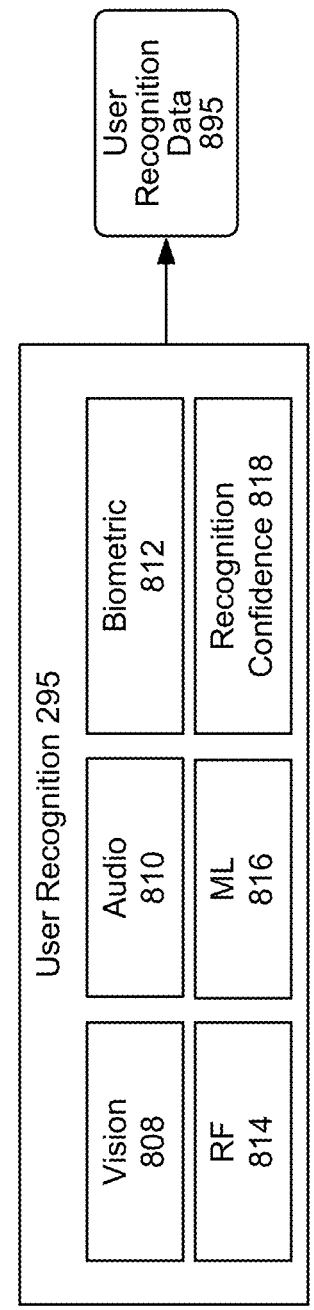
FIG. 8A illustrates a user-recognition component according to embodiments of the present disclosure.

The system(s) 120 may include a user-recognition component 295, which is shown in greater detail in FIG. 8A, that recognizes one or more users associated with data input to the system. The user-recognition component 295 may take as input the audio data 211 and/or text data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage may store data corresponding to detection of an acoustic event; if, for example, the user 10 configures a new user device 110 after defining an acoustic event, data from the profile storage 270 corresponding to the event may be sent to the new user device 110.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application 226 installed on a user device 110, the user profile (associated with the presented login information) may be updated to include information about the user device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 120 may be configured to incorporate user permissions and may only perform activities disclosed herein if approved by a user. As described above, these permissions may include a grant (or denial) to use a particular speech-processing system 292. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system may include one or more notification system(s) 121 which may include an event notification component 228. Although illustrated as a separate system, notification system(s) 121 may be configured within remote system(s) 120, device 110, or otherwise depending on system configuration. For example, event notification component 228 may be configured within remote system(s) 120, device 110, or otherwise. The event notification component 228 may handle sending notifications/commands to other devices upon the occurrence of a detected acoustic event. The event notification component 228 may have access to information/instructions (for example as associated with profile storage 270 or otherwise) that indicate what device(s) are to be notified upon detection of an acoustic event, the preferences associated with those notifications or other information. The event notification component 228 may have access to information/instructions (for example as associated with profile storage 270 or otherwise) that indicate what device(s) are to perform what actions in response to detection of an acoustic event (for example locking a door, turning on/off lights, notifying emergency services, or the like. Further detail regarding the event notification component may be found below with regard to FIG. 8B.

Figure 3D:
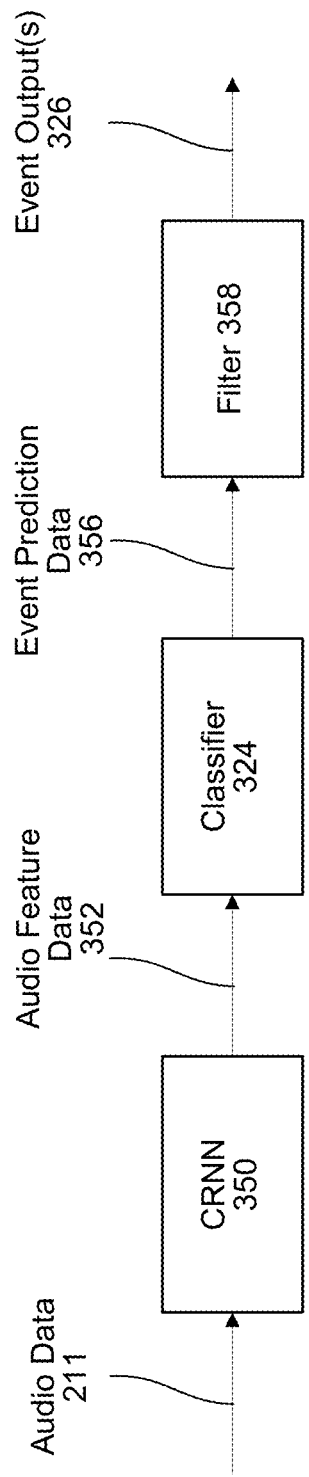

FIGS. 3A-3D illustrate systems for detecting an acoustic event. As shown in FIG. 3A, a device 110 may include one or more microphone(s) 920 that detect audio and create audio data 211. The audio data 211 may be sent to AFE(s) 220 for processing, for example into audio feature data and sent to wakeword detector 224. The AFE(s) 220 may also process audio data and send the results to AED 222. In one example one acoustic front end 220a may prepare audio feature data for processing by AED component 222 while another acoustic front end 220b may prepare audio feature data for another component, for example wakeword detector 224. Alternatively, the same feature data used by wakeword detector 224 may be used by AED 222. The audio data 211 and/or output from AFE(s) 220 may be sent to AED 222. The AED 222 may also take in other data 217 which may include, for example, time data, image data, sensor data from other sensors in an environment, or the like. The AED 222 may include a feature encoder 306 and encoded feature data comparator 310, which perform operations as further discussed below in reference to FIG. 3B. The AED 222 may also include an event classifier 324 which may classify incoming audio data/feature data as to whether such data represents an acoustic event that the classifier 324 is trained to recognized as described herein, for example with respect to FIG. 3C below or otherwise discussed herein. The AED may also include CRNN 350 and filter 358 whose operations are discussed below in reference to FIG. 3D. The AED may output an indication of detection of an event as event output data 326. Such data 326 may include an identifier of the detected event, a score corresponding to the likelihood of detection, or other related data. Such output data 326 may then be sent over network 199 and/or to a downstream component, for example notification system(s) 121/event notification component 228 or another device.

Referring next to FIG. 3B, as described above, an acoustic front end 220 may process audio data 211 (e.g., data received from one or more microphones) to determine audio feature data 304, which (as also described above) may include audio features such as MFCCs for each of a plurality of frames of audio data. The acoustic front end 220 may include, for example, amplifiers to amplify the data from the microphone(s), analog-to-digital converters to convert the analog microphone data to digital data, Fourier transform components such as FFTs to convert the time-domain audio data into frequency-domain audio data, and further processing components to extract features from the frequency-domain audio data, such as MFCC processing components.

As illustrated, a single acoustic front end 220 processes the audio data 311. In other embodiments, however, two or more different acoustic front ends 220 process the audio data 211 for two or more different feature encoders 306. The feature encoder 306 may, in certain configurations, be included within AED 222. A first type of feature extraction may be suitable for identifying features for a first acoustic event, while a second type of feature extraction may be suitable for identifying features for a second acoustic event. Thus, a first acoustic front end 220a may be used for a first feature encoder (corresponding to one or more first events) while a second acoustic front end 220b may be used for a second feature encoder (corresponding to one or more second events). The different acoustic front ends 220a, 220b may be entirely different acoustic front ends or may be a same configurable acoustic front end configured with different parameters specific to each acoustic event and/or type of acoustic event.

For example, a first acoustic front end 220a may be configured to extract features that are most easily distinguishable by human hearing. For example, human hearing tends to more easily distinguish between different tones in a lower frequency range (e.g., 20 Hz-10 kHz) than tones in a higher frequency range (e.g., 10 kHz-20 kHz), and the first acoustic front end 220a may thus emphasize features in that lower range. The first acoustic front end 220a may thus extract features corresponding to sounds made by humans (e.g., a baby crying) and/or sounds designed for humans to hear (e.g., a doorbell or microwave beeping), but may not extract features for other types of sounds (e.g., glass breaking). A second acoustic front end 220b may thus be selected and/or configured to extract features corresponding to these other types of sounds and output the features to a feature encoder 306 designed to encode them.

The feature encoder 306 may be a neural network consisting of one or more layers of nodes, such as CNN or LSTM nodes, that processes multiple frames of acoustic feature data 304 corresponding to an acoustic event and ultimately outputs a single N-dimensional vector that uniquely identifies the event. That is, a first N-dimensional vector is first encoded feature data that represents a first acoustic event, a second N-dimensional vector is second encoded feature data that represents a second acoustic event, and so on. The N-dimensional vectors may correspond to points in an N-dimensional space known as an embedding space or feature space; in this space, points that represent similar-sounding events are disposed closer to each other, while points that represent different-sounding events are disposed further from each other. The feature encoder 306 may be generated by processing training data representing a wide variety of events; if the feature encoder 306 processes two items of audio data from two events known to be different, but maps them to similar points in the embedding space, the feature encoder 306 is re-trained so that it maps the training data from the different events to different points in the embedding space. Similarly, if the feature encoder 306 processes two items of audio data from two events known to be similar, but maps them to different points in the embedding space, the feature encoder 306 is re-trained so that it maps the training data from the similar events to similar points in the embedding space.

The feature encoder outputs encoded feature data 308, which is processed by an encoded feature data comparator 310. The encoded feature data comparator 310 may compare the items of encoded feature data 308 to one or more items of predetermined event data 312, each of which may correspond to a predetermined event, such as a generic doorbell ring. If each of the values of the encoded feature data 308 (e.g., each of the values of the N-vector) are within a threshold or thresholds of each of the corresponding values of one of the predetermined event data 312, the encoded feature data comparator 310 may determine that a corresponding event occurred and may send an indication 326 of that detected event to other components of the user device 110 and/or remote system 120 for further processing (e.g., output corresponding to detection of the event).

As mentioned above, the AED component 222 may be configured to detect user-defined acoustic events. In these embodiments, when the user device 110 determines audio data corresponding to one or more occurrences of the events, the user device 110 and/or remote system 120 processes the audio data using the feature encoder 306 (and/or a copy of the feature encoder 306) to determine points in the embedding space corresponding to the new events. These points may be used and/or sent to the user device 110 as the determined event data 314; the encoded feature data comparator 310 may then compare the determined event data 314 to the encoded feature data 308, similar to how it compares the predetermined event data 312 to the encoded feature data 308, and similarly send an indication 326 of any detected events.

The user device 110 and/or remote system 120 may determine the determined event data 314 in a number of different ways. If multiple examples of the occurrence of the new acoustic event are received as represented in audio data, the user device 110 and/or remote system 120 may encode each example to a different point in the embedding space. The different points may define an N-dimensional shape; the encoded feature data comparator 310 may deem that encoded feature data 308 that defines a point within the shape, or within a threshold distance of a surface of the shape, indicates occurrence of the event. In other embodiments, the user device 110 and/or remote system 120 determines a single point that represents the various points determined from the plurality of occurrences. For example, the single point may represent the average of each of the values of the items of encoded feature data 308. The single point may further represent the center of the shape defined by the points.

One or more of the points defined by processing the audio data corresponding to the occurrences of the acoustic event may be discarded. For example, if two or more points are determined to be relatively near each other in the embedding space, but one or more points are determined to be relatively far away from the two or more relatively near points, the relatively far-away point(s) may not be used when determining the shape, the center, or the average (as described above). For example, the user device 110 may prompt for three occurrences of the acoustic event, but audio data corresponding to one of the occurrences may include noise (e.g., a car horn honked while the doorbell was ringing). This noisy audio data may be identified by its distance, from the other points, in the embedding space, and therefore discarded.

In other embodiments, if there are at least three items of audio data that represent at least three occurrences of the acoustic event, the user device 110 and/or remote system 120 may attempt to determine the shape, average, and/or center of the corresponding points in the embedding space using only two (or other subset) of the points determined from the audio data and then test the result using the third (or other additional) item of audio data. If processing the third item of audio data results in a point corresponding to the shape, average, and/or center determined from the first two items of audio data, the user device 110 and/or remote system 120 may deem that the shape, average, and/or center accurately estimates the occurrence of the audio event and may cause reconfiguration of the AED component 220 accordingly. The user device 110 and/or remote system 120 may further define the shape, average, and/or center using other combinations of subsets of the audio data and test the shape, average, and/or center with other items of audio data. If, for example, a certain combination of items of audio data results in a shape, average, and/or center that fails to process additional items of audio data to determine that those items correspond to the occurrence of the audio event, those combinations and/or items of audio data common to those combinations may be discarded, and the shape, average, and/or center may be determined using remaining items of audio data. In some embodiments, the user device 110 and/or remote system may cause the user device 110 (and/or other user device) to prompt the user for additional audio data representing additional occurrences of the acoustic event and then process those addition items of audio data to determine the shape, average, and/or center.

Referring to FIG. 3C, in other embodiments, an event classifier 324 may process audio feature data 322 determined, by the acoustic front end 220, from audio data 211. The event classifier 324 may output one or more event output(s) 326 corresponding to one or more predetermined event outputs(s) 328 and/or one or more determined event output(s) 330. The event classifier 324 may similarly be reconfigured, by the user device 110 and/or remote system 120, to detect one or more determined event output(s) 330 based at least in part on audio data corresponding to occurrences of new acoustic events.

The audio data corresponding to the occurrences of new acoustic events may be used as training data to re-train the event classifier 324 to detect the new event(s). For example, the event classifier 324 may process the audio data, and its output may be evaluated using a performance function, such as a loss function, to evaluate its performance in detecting the new event as a new determined event output 330. New values of nodes of the event classifier 324 may be determined using a stochastic process, such as a gradient descent algorithm, and then back-propagated throughout. If the event classifier 324 fails to determine the new event, the user device 110 may output further prompts for further audio data representing further occurrences of the event, which then may be used as further training data for the event classifier 324. If the remote system 120 performs this training, it may send, to the user device 110, configuration data for the AED component 222, which may be instructions that implement an AED component 222 and/or configuration data for re-configuring an existing AED component 222 (e.g., new values for some or all of the nodes of the AED component 222).

As show in FIG. 3D, the audio data 211 may be processed by a first model, such as a convolutional recurrent neural network (CRNN) 350 to determine audio feature data 352. The audio feature data 352 may correspond to a one-dimensional vector and/or two-dimensional feature map where one dimension corresponds to time and another dimension corresponds to feature data. The time resolution may not necessarily be the same as the original input audio data 211. For example, one time unit of the audio feature data 352 may correspond to a longer time duration than an original audio frame. One time unit of the audio feature data 352 may, for example, correspond to eight audio data frames (though various such resolutions are possible using the system). Thus each time unit of audio feature data 352 may include data corresponding to many different original audio data frames.

To produce the audio feature data 352, the CRNN 350 may be trained as a residual network structure and convolutional network, which may include two (or more) convolutional blocks and any number of layers. A first convolutional layer may process the audio data 211 and with a stride of (2,1) (meaning the layer may skip an output every two timestamps). CRNN then may have a max pooling layer with a stride of (2,2) resulting in a 2× time dimensionality reduction and a 2× frequency reduction. The result of a max pooling layer may then processed by the next two convolutional blocks/residual network blocks (e.g., Cony 3×3, 64), the output of which is then processed by the next two convolutional blocks (Cony 3×3, 128). An average pooling block may then be used to further reduce the dimensionality before feeding into a bi-directional gated recurrent unit (GRU) layer to produce the audio feature data 352. The audio feature data 352 may have a time resolution of (for example) 186 milliseconds, e.g., eight times the resolution of an input spectrogram. The number of units in the feature data may correspond to the number of units in the bi-directional GRU layer of the CRNN.

As shown in FIG. 3D, the system may employ a classifier 324 to determine event raw prediction data 356 as well as a filter 358 to pass only one or more top-scoring adjusted time windows (e.g., the top 50 or top 100) to other components. The filter 358 may also employ non-maximum suppression (NMS) or other techniques to avoid passing to the other components candidate time windows that may substantially overlap. For example, the filter 358 may evaluate incoming candidate adjusted time windows in the event prediction data 356 against each other to make sure that individual candidate time windows are sufficiently independent from each other. The event output data 326 may not necessarily, however, include scores for the time windows.

FIGS. 4A, 4B, and 4C illustrate methods of using AED components according to embodiments of the present disclosure. Referring first to FIG. 4A, in some embodiments, the user device 110 determines (402) that audio data received from a microphone includes a wakeword. The user device 110 may be configured, as described above, to recognize the wakeword in received audio data and then send, to the remote system, corresponding audio data 404. The remote system 120 may process the audio data (using, e.g., the ASR and/or NLU techniques described herein) to determine that the audio data corresponds to a command to define a new acoustic event.

The remote system 120 may then send a request (408) to an AED skill system 225 to learn the new event. The AED skill system 225 (or other component) may determine (409) an audio capture time window corresponding to how long a device should send audio data to the AED skill system 225 (or otherwise send audio data related to the training). The audio capture time window may correspond to how long an acoustic event is estimated to take. For example, the audio capture time window may be a certain time for a first event (e.g., a few seconds for a door closing) to a longer time for a different event (e.g., 30 seconds or more for a toilet running). The audio capture time window may be determined by the system depending on a type of the acoustic event to be detected (e.g., a sudden event, medium length event, drawn out event, etc.) The audio capture time window may allow the system to ensure that no unnecessary audio captured by the device 110 is sent to the system, thus further ensuring privacy, etc. The AED skill system 225 may then send (410), to the user device 110 (and/or other user device(s)), one or more audio or visual prompts to cause occurrence of the event. The AED skill system 225 may also instruct (411) the device 110 (or other device) to send audio data at the beginning of the audio capture time window. The user device 110 may output the prompt and capture (412) audio data that represents the occurrence(s) of the events. The AED skill system 225 may instruct (413) the device to stop audio capture at the end of the audio capture time window. The instruction to stop sending audio data 413 may be included with the instruction 411 to send audio data (e.g., a single instruction maybe sent along with time information indicating how long the device should capture/send audio for in order to capture the audio of the desired acoustic event.) The instruction to stop sending audio data 413 may also be sent after the event audio data is sent 414. In another embodiment the system may instruct the device 110 to stop sending audio data after the device/system detects a pause or other break in acoustic activity. For example, upon sending the instruction (411) to send audio data, the system may instruct the device 110 to stop sending audio data upon detecting audio data with a sufficiently low magnitude for a certain period of time. The level of magnitude and/or period of time may be based on the acoustic event. For example, in the case of learning the sound of an expected lengthy event (e.g., a toilet running) the system may not instruct the device to stop sending audio for a longer period of low magnitude audio (e.g., 30 seconds). The system may also instruct the device 110 to stop sending audio upon a sudden change in the audio data. For example, in the case of learning the sound of an expected sudden event, the system may instruct the device to stop sending audio data upon detecting audio of a large magnitude for a short time (e.g., one second or less) and then detecting of audio of a low magnitude for a short time (e.g., one second). The system itself may also perform these evaluations of the audio data in order to determine when to cease audio capture by the device. For example the system (e.g., 120/225) may process the received event audio data (e.g., audio data send in step 414) to determine a drop in magnitude for a certain time period and once detected, may instruct (413) the device 110 to stop audio capture.

The user device may then send corresponding event audio data 414 to the AED skill system 225, which may then configure (416) the AED component using the audio data, as described above. The AED skill system 225 may then send AED configuration data 418 (e.g., data vectors representing points in embedding space, model parameters for the classifier 324, and/or other data) to the user device 110.

The event audio data 414 may represent other audio beyond the event audio data 414. In certain situations the system 120/225 may be configured to remove the extraneous audio prior to configuring (416) the AED component using the audio data. For example, if the system detects speech in the event audio data (for example using a VAD/VAD techniques or other techniques disclosed herein) the system may remove the portion of the audio data representing the speech and may only proceed to training/configuring the AED component using the event audio data with the speech portion removed.

Referring to FIG. 4B, a first user device 110*a* may detect an event 420, which may be a user-defined event, as described herein. The first user device 110*a* (which may be, for example, an Amazon Echo) may send an indication 422 of detection of the event to a second user device 110*b* (which may be, for example, a smartphone). The second user device 110*b* may output (424) an indication of the detection.

The first user device 110*a* may also send event data 426 corresponding to the event to the remote system 120. As described herein, the first user device 110 may detect the event based on limited training data, so the event data 426 may be regarded as additional training data. The remote system 120 may, using the event data 426, reconfigure the AED component 430 and send corresponding AED re-configuration data 432 to the first user device 110*a*.

Referring to FIG. 4C, the user 10 of the user device 110 may wish to configure the user device 110 to perform one or more "if-then" determinations based on two or more acoustic events. For example, the user 10 may not wish to be notified every time the user device 110 detects that a microwave beeps; instead, the user may wish that the user device 110 determines that, upon detection of the microwave beeping, it will send data to a second user device notifying the user 10 of the beep only if it does not detect the sound of the door of the microwave opening and/or closing within a period of time after detection of the beep (e.g., five minutes). The user 10 may speak an utterance specifying this condition and/or the user device 110 and/or remote system 120 may determine that such a condition is likely (e.g., determining that the first acoustic event corresponds to a timer expiring and cause output, by the user device 110, of a prompt for the second acoustic event.

The first user device 110*a* may thus detect (440) occurrence of the first event (e.g., a microwave beeping) but may then wait for a period of time for detection of the second event (e.g., the microwave door opening/closing). If the first user device 110*a* fails (442) to detect the second event within the time period, it may then send an indication 444 of the event to the second user device 110*b*. The second user device 110*b* may output (446) sound, video, or other output corresponding to the indication.

The user of the second user device 110*b* may send, to the first user device 110*a*, an indication 448 of success or failure. For example, the user 10 may receive the indication that the microwave door did not open or close, even though the user 10 did in fact open and close the microwave door. The first user device 110*a* may then send second event data 450 to the remote system 120 (e.g., the audio data that may include a representation of the microwave door opening and/or closing), and the remote system 120 may similarly reconfigure (452) the AED component 222 such that, given the second event data 450, it determines that the second event data 450 includes a representation of the second event. The remote system 120 may then send corresponding AED re-configuration data 454 to the first user device 110*a*.

FIG. 5 illustrates how NLU processing may be performed on input text data. The NLU component 260 (such as the one depicted in FIG. 2) determines a semantic interpretation of text represented in text data. That is, the NLU component 260 determines the meaning behind the text represented in text data based on the individual words. The NLU component 260 interprets the text to derive an intent or a desired action of the user as well as the pertinent pieces of information in the text (e.g., entities) that allow a device (e.g., the user device 110, system 120, skill(s) 290, and/or skill system(s) 225) to complete that action.

The NLU component 260 may process text data to determine several hypotheses of a domain, intent, and/or entity corresponding to a single utterance. For example, if the ASR component 250 outputs ASR results including an N-best list of hypotheses, the NLU component 260 may process the text data with respect to all (or a portion of) the textual interpretations represented therein. The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 550. The shortlister component 550 selects applications that may execute with respect to text data 610 input to the NLU component (e.g., applications that may execute the command). The shortlister component 550 thus limits downstream, more resource intensive NLU processes to being performed with respect to applications that may execute the command.

Without a shortlister component 550, the NLU component 260 may process a given hypothesis with respect to every application of the system, either in parallel, in series, or using some combination thereof. By including a shortlister component 550, the NLU component 260 may process a given hypothesis with respect to only the applications that may execute the command. This reduces total compute power and latency attributed to NLU processing.

The NLU component 260 may include one or more recognizers 563a-n. Each recognizer 563 may be associated with a different function, content source, and/or speech-processing system. The NLU component 260 may determine a function potentially associated with the command represented in text data input thereto in order to determine the proper recognizer 563 to process the hypothesis. The NLU component 260 may determine a command represented in text data is potentially associated with more than one function. Multiple recognizers 563 may be functionally linked (e.g., a telephony/communications recognizer and a calendaring recognizer may utilize data from the same contact list).

If the shortlister component 550 determines text corresponding to a hypothesis is potentially associated with multiple skills 290 and/or multiple speech-processing systems, the recognizers 563 associated with the skills 290 and/or multiple speech-processing systems (e.g., the recognizers 563 associated with the applications in the subset selected by the shortlister 550) may process the text. The selected recognizers 563 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 563 may be scored, with the overall highest scored output from all recognizers 563 ordinarily being selected to be the correct result.

The NLU component 260 may communicate with various storages to determine the potential speech-processing system(s) associated with a command represented in text data. The NLU component 260 may communicate with an NLU storage 573, which includes databases of devices (574a-574n) identifying functions associated with specific devices. For example, the user device 110 may be associated with speech-processing systems for music, calendaring, contact lists, device-specific communications, etc. In addition, the NLU component 260 may communicate with an entity library 582, which includes database entries about specific services on a specific device, either indexed by device ID, user ID, or group user ID, or some other indicator.

Each recognizer 563 may include a named entity recognition (NER) component 562. The NER component 562 attempts to identify grammars and lexical information that may be used to construe meaning with respect to a command represented in text data input therein. The NER component 562 identifies portions of text represented in text data input into the NLU component 260 that correspond to a named entity that may be recognizable by the system. The NER component 562 (or other component of the NLU component 260) may also determine whether a word refers to an entity that is not explicitly mentioned in the utterance text, for example words such as "him," "her," or "it."

Each recognizer 563, and more specifically each NER component 562, may be associated with a particular grammar model 576, a particular set of intents 578, and a particular personalized lexicon 586. Each gazetteer 584 may include function-indexed lexical information associated with a particular user and/or device. For example, gazetteer A (584a) includes function-indexed lexicons 586aa to 586an. A user's music function lexical information might include album titles, artist names, and song names, for example, whereas a user's contact-list lexical information might include the names of contacts. Since every user's music collection and contact list is presumably different, this personalized information improves entity resolution.

An NER component 562 may apply grammar models 576 and/or lexicons 586 associated with the function (associated with the recognizer 563 implementing the NER component 562) to determine a mention one or more entities in text data input thereto. In this manner, the NER component 562 may identify "slots" (i.e., particular words in text data) that may be needed for later command processing. The NER component 562 may also label each slot with a type of varying levels of specificity (e.g., noun, place, city, artist name, song name, etc.).

Each grammar model 576 may include the names of entities (i.e., nouns) commonly found in text about the particular function to which the grammar model 576 relates, whereas the lexicon 586 is personalized to the user(s) and/or the user device 110 from which the input data or input text data originated. For example, a grammar model 576 associated with a shopping function may include a database of words commonly used when people discuss shopping.

A process called named entity resolution may link a portion of text to an entity known to the system. To perform this named entity resolution, the NLU component 260 may use gazetteer information (584a-584n) stored in an entity library storage 582. The gazetteer information 584 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 563 may also include an intent classification (IC) component 564. The IC component 564 parses text data to determine an intent(s) of the function associated with the recognizer 563 that potentially corresponds to the text data. An intent corresponds to an action to be performed that is responsive to the command represented by the text data. The IC component 564 may communicate with a database 578 of words linked to intents. For example, a music intent database may link words and phrases such as "quiet," "volume off," and "mute" to a "mute" intent. The IC component 564 identifies potential intents by comparing words in the text data to the words and phrases in an intents database 578 associated with the function that is associated with the recognizer 563 implementing the IC component 564.

The intents identifiable by a specific IC component 564 may be linked to function-specific (i.e., the function associated with the recognizer 563 implementing the IC component 564) grammar model 576 with "slots" to be filled. Each slot of a grammar model 576 may correspond to a portion of the text data that the system believes corresponds to an entity. For example, a grammar model 576 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified object and any object modifier (e.g., a prepositional phrase), such as {Artist Name}, {Album Name}, {Song Name}, etc. The NER component 562 may then search corresponding fields in a lexicon 586 associated with the function associated with the recognizer 563 implementing the NER component 562 and may match words and phrases in the text data the NER component 562 previously tagged as a grammatical object or object modifier with those identified in the lexicon 586.

The NER component 562 may perform semantic tagging, which is the labeling of a word or combination of words according to their type/semantic meaning. The NER component 562 may parse text data using heuristic grammar rules, or a model may be constructed using techniques such as hidden Markov models, maximum entropy models, log linear models, conditional random fields (CRF), and the like. For example, an NER component 562 implemented by a music function recognizer 563 may parse and tag text corresponding to "play mother's little helper by the rolling stones" as {Verb}: "Play," {Object}: "mother's little helper," {Object Preposition}: "by," and {Object Modifier}: "the rolling stones." The NER component 562 may identify "Play" as a verb based on a word database associated with the music function, which an IC component 564 (which may also implemented by the music function recognizer 563) may determine that the word corresponds to a <PlayMusic> intent. At this stage, no determination may have been made as to the meaning of "mother's little helper" and "the rolling stones," but based on grammar rules and models, the NER component 562 may have determined that the text of these phrases relates to the grammatical object (i.e., entity) of the text data.

The frameworks linked to the intent may then be used to determine what database fields may be searched to determine the meaning of these phrases, such as searching a user's gazetteer 584 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 584 does not resolve a slot/field using gazetteer information, the NER component 562 may search, in the knowledge base 572, the database of generic words associated with the function. For example, if the text data includes text corresponding to "play songs by the rolling stones," after failing to determine an album name or song name called "songs" by "the rolling stones," the NER component 562 may search the function's vocabulary for the word "songs." In the some embodiments, generic words may be checked before the gazetteer information, or both may be tried, potentially producing two different results.

The NLU component 260 may tag text to attribute meaning to the text. For example, the NLU component 260 may tag "play mother's little helper by the rolling stones" as {intent}: <PlayMusic>, {artist name}: rolling stones, {media type}: SONG, and {song title}: mother's little helper. In another example, the NLU component 260 may tag "play songs by the rolling stones" as {intent}: <PlayMusic>, {artist name}: rolling stones, and {media type}: SONG.

The shortlister component 550 may receive text data 610 output from the ASR component 250 (as illustrated in FIG. 6). The ASR component 250 may embed the text data 610 into a form processable by a trained model(s) using sentence-embedding techniques. Sentence embedding may include, in the text data 610, text in a structure that enables the trained models of the shortlister component 550 to operate on the text. For example, an embedding of the text data 610 may be a vector representation of the text data.

The shortlister component 550 may make binary determinations (e.g., yes or no determinations) regarding which skill(s) 290 relate to the text data 610. The shortlister component 550 may make such determinations using the one or more trained models described herein above. If the shortlister component 550 implements a single trained model for each skill 290, the shortlister component 550 may simply run the models that are associated with enabled applications as indicated in a profile (e.g., profile 502) associated with the user device 110 and/or user that originated the command.

The shortlister component 550 may generate N-best list data representing applications that may execute with respect to the command represented in the text data 610. The size of the N-best list represented in the N-best list data is configurable. In an example, the N-best list data may indicate every application of the system as well as contain an indication, for each application, regarding whether the application is likely capable to execute the command represented in the text data 610. In another example, instead of indicating every application of the system, the N-best list data may only indicate all of the applications that are likely to be able to execute the command represented in the text data 610. In yet another example, the shortlister component 550 may implement thresholding such that the N-best list data may indicate no more than a maximum number of applications that may execute the command represented in the text data 610. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 610 by the shortlister component 550 relative to such applications).

The NLU component 260 may compile data, output by each of the recognizers 563 that processed the text data input to the NLU component 260, into a single N-best list, and may send N-best list data 640 (representing the N-best list) to a pruning component 650 (as illustrated in FIG. 6). Each entry in the N-best list data 640 may correspond to tagged text output by a different recognizer 563. Each entry in the N-best list data 640 may be associated with a respective score indicating the tagged text corresponds to the function associated with the recognizer 563 from which the tagged text was output. The pruning component 650 creates a new, shorter N-best list (i.e., represented in N-best list data 660 discussed below) based on the N-best list data 640. The pruning component 650 may sort the tagged text represented in the N-best list data 640 according to their respective scores.

The pruning component 650 may perform score thresholding with respect to the N-best list data 640. For example, the pruning component 650 may select entries represented in the N-best list data 640 associated with a score satisfying (e.g., meeting and/or exceeding) a score threshold. The pruning component 650 may also or alternatively perform number of entry thresholding. For example, the pruning component 650 may select the top scoring entry(ies) associated with each different category of function (e.g., music, shopping, communications, etc.) represented in the N-best list data 640, with the new N-best list data 660 including a total number of entries meeting or falling below a threshold number of entries. The purpose of the pruning component 650 is to create a new list of top scoring entries so that downstream, more resource intensive processes may only operate on the tagged text entries that most likely correspond to the command input to the system.

The NLU component 260 may also include a light slot filler component 652. The light slot filler component 652 can take text from slots represented in the tagged text entry or entries output by the pruning component 650 and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a tagged text entry includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the N-best list data 660.

The NLU component 260 sends the N-best list data 660 to an entity resolution component 670. The entity resolution component 670 can apply rules or other instructions to standardize labels or tokens from previous stages into an intent/slot representation. The precise transformation may depend on the function (e.g., for a travel function, the entity resolution component 670 may transform a text mention of "Boston airport" to the standard BOS three-letter code referring to the airport). The entity resolution component 670 can refer to an authority source (e.g., a knowledge base) that is used to specifically identify the precise entity referred to in each slot of each tagged text entry represented in the N-best list data 660. Specific intent/slot combinations may also be tied to a particular source, which may then be used to resolve the text. In the example "play songs by the stones," the entity resolution component 670 may reference a personal music catalog, Amazon Music account, user profile (described herein), or the like. The entity resolution component 670 may output data including an altered N-best list that is based on the N-best list represented in the N-best list data 660, but also includes more detailed information (e.g., entity IDs) about the specific entities mentioned in the slots and/or more detailed slot data that can eventually be used by a function. The NLU component 260 may include multiple entity resolution components 670 and each entity resolution component 670 may be specific to one or more functions.

The entity resolution component 670 may not be successful in resolving every entity and filling every slot represented in the N-best list data 660. This may result in the entity resolution component 670 outputting incomplete results. The NLU component 260 may include a final ranker component 690, which may consider such errors when determining how to rank the tagged text entries for potential execution. For example, if a book function recognizer 563 outputs a tagged text entry including a <ReadBook> intent flag, but the entity resolution component 670 cannot find a book with a title matching the text of the item, the final ranker component 690 may re-score that particular tagged text entry to be given a lower score. The final ranker component 690 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 690 may apply re-scoring, biasing, or other techniques to obtain the most preferred tagged and resolved text entry. To do so, the final ranker component 690 may consider not only the data output by the entity resolution component 670, but may also consider other data 691. The other data 691 may include a variety of information. For example, the other data 691 may include function rating or popularity data. For example, if one function has a particularly high rating, the final ranker component 690 may increase the score of a tagged text entry or entries associated with or otherwise invoking that particular function. The other data 691 may also include information about functions that have been specifically enabled by the user. For example, the final ranker component 690 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 690 may consider when any particular functions are currently active (e.g., music being played, a game being played, etc.). Following final ranking, the NLU component 260 may output NLU output data 685 to the orchestrator component 240. The NLU output data 685 may include various entries, with each entry representing an NLU processing confidence score, an intent, slot data, and a potential skill or skill that may operating with respect to the respective entry's data.

The data 685 output from the NLU component 260 may include an N-best list of NLU results, where each item in the N-best list may correspond to a particular recognizer 563 and corresponding skill 290. Thus, for example, first NLU results of the N-best list may be associated with a first skill 290a, second NLU results of the N-best list may be associated with a second skill 290b, third NLU results of the N-best list may be associated with a third skill 290c, etc. Moreover, the first NLU results may correspond to text tagged to attribute meaning that enables the first skill 290a to execute with respect to the first NLU results, the second NLU results may correspond to text tagged to attribute meaning that enables the second skill 290b to execute with respect to the second NLU results, the third NLU results may correspond to text tagged to attribute meaning that enables the third skill 290c to execute with respect to the third NLU results, etc. The data 685 may also include scores corresponding to each item in the N-best list. Alternatively, the NLU result data 685 output to a particular skill 290 may include NER and IC data output by the particular skill's recognizer 563 while the NLU result data 685 output to the orchestrator component 240 may include only a portion of the NLU result data 685, for example the scores corresponding to certain skills.

The system may be configured with thousands, tens of thousands, etc. skills 290. The orchestrator component 240 enables the system to better determine the best skill 290 to execute the command input to the system. For example, first NLU results may correspond or substantially correspond to second NLU results, even though the first NLU results are operated on by a first skill 290a and the second NLU results are operated on by a second skill 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 240 may solicit the first skill 290a and the second skill 290b to provide potential result data based on the first NLU results and the second NLU results, respectively. For example, the orchestrator component 240 may send the first NLU results to the first skill 290a along with a request for the first skill 290a to at least partially execute a command with respect to the first NLU results. The orchestrator component 240 may also send the second NLU results to the second skill 290b along with a request for the second skill 290b to at least partially execute a command with respect to the first NLU results. The orchestrator component 240 receives, from the first skill 290a, first result data generated from the first skill's execution with respect to the first NLU results. The orchestrator component 240 also receives, from the second skill 290b, second results data generated from the second skill's execution with respect to the second NLU results.

The result data 630 may include various components. For example, the result data 630 may include content (e.g., audio data, text data, and/or video data) to be output to a user. The result data 630 may also include a unique identifier (ID) used by the remote system 120 and/or the skill server(s) 225 to locate the data to be output to a user. The result data 630 may also include an instruction. For example, if the command corresponds to "turn on the light," the result data 630 may include an instruction causing the system to turn on a light associated with a profile of the user device 110 and/or user.

The orchestrator component 240 may, prior to sending the NLU results data 685 to the orchestrator component 240, associate intents in the NLU results data 685 with skills 290. For example, if the NLU results data 685 includes a <PlayMusic> intent, the orchestrator component 240 may associate the NLU results data 685 with one or more skills 290 that can execute the <PlayMusic> intent. Thus, the orchestrator component 240 may send the NLU results data 685 paired with skills 290 to the orchestrator component 240. In response to input text data corresponding to "what should I do for dinner today," the orchestrator component 240 may generates pairs of skills 290 with associated intents corresponding to:

Skill 1/<Roll Down Window>
Skill 2/<Start Navigation>
Skill 3/<Play Music>

A system that does not use the orchestrator component 240 as described above may instead select the highest scored preliminary ranked NLU results data 685 associated with a single skill. The system may send the NLU results data 685 to the skill 290 along with a request for output data. In some situations, the skill 290 may not be able to provide the system with output data. This results in the system indicating to the user that the command could not be processed even though another skill associated with lower ranked NLU results data 685 could have provided output data responsive to the command.

Components of a system that may be used to perform unit selection, parametric TTS processing, and/or model-based audio synthesis are shown in FIG. 7. As shown in FIG. 7, the TTS component 280 may include a TTS front end 716, a speech synthesis engine 718, TTS unit storage 772, TTS parametric storage 780, and a TTS back end 734. The TTS unit storage 772 may include, among other things, voice inventories 778a-288n that may include pre-recorded audio segments (called units) to be used by the unit selection engine 730 when performing unit selection synthesis as described below. The TTS parametric storage 780 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 280, within the memory and/or storage of the server 120, device 110, or within an external device.

Text data 710 input into the TTS component 280 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, diphones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*).

Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 212 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 780 based on feedback of the results of TTS processing, thus enabling the TTS component 280 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 720 to ultimately create the output audio data 212.

When performing unit selection, after a unit is selected by the unit selection engine 730, the audio data corresponding to the unit may be passed to the audio data modification component 720. The audio data modification component 720 may then process the audio data of the unit to create modified audio data where the modified audio data reflects a desired audio quality. The audio data modification component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the audio data modification component 720 may process the audio data for that unit to create a modified unit audio data. The modified unit audio data may then be concatenated to form the output audio data 212. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data 212 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 212 may include other output data 785 that may include a prosody tag or other indicator that instructs the device 110 to slow down the playback of the output audio data 212, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

As illustrated in FIG. 8A, the user-recognition component 295 may include one or more subcomponents including a vision component 808, an audio component 810, a biometric component 812, a radio-frequency (RF) component 814, a machine-learning (ML) component 816, and a recognition confidence component 818. In some instances, the user-recognition component 295 may monitor data and determinations from one or more subcomponents to determine an identity of one or more users associated with data input to the system. The user-recognition component 295 may output user-recognition data 895, which may include a user identifier associated with a user the system believes is originating data input to the system. The user-recognition data 895 may be used to inform processes performed by the orchestrator 240 (or a subcomponent thereof) as described below.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user-recognition component 295 may utilize determinations from additional components to determine an identity of a user. The vision component 808 can be used in conjunction with other components to determine an identity of a user. For example, the user-recognition component 295 may use data from the vision component 808 with data from the audio component 810 to identify what user's face appears to be speaking at the same time audio is captured by the user device 110 for purposes of identifying a user who spoke an input to the user device 110.

The user device 110 may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The user device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the user device 110 may include some RF or other detection processing capabilities so that a user who speaks an input may scan, tap, or otherwise acknowledge his/her personal device to the user device 110. In this manner, the user may "register" with the user device 110 for purposes of the user device 110 determining who spoke a particular input. Such a registration may occur prior to, during, or after speaking of an input.

The ML component 816 may track the behavior of various users as a factor in determining a confidence level of the identity of the user. For example, a user may adhere to a regular schedule such that the user is at a first location during the day (e.g., at work or at school). In this example, the ML component 816 factors in past behavior and/or trends into determining the identity of the user that provided input to the user device 110. Thus, the ML component 816 may use historical data and/or usage patterns over time to increase or decrease a confidence level of an identity of a user.

In some instances, the recognition confidence component 818 receives determinations from the various components 808, 810, 812, 814, and 816, and may determine a final confidence level associated with the identity of a user. The confidence level or other score data may be included in the user-recognition data 895.

The audio component 810 may receive data from one or more sensors capable of providing an audio signal (e.g., one or more microphones) to facilitate recognizing a user. The audio component 810 may perform audio recognition on an audio signal to determine an identity of the user and associated user identifier. In some instances, the audio component 810 may perform voice recognition to determine an identity of a user.

The audio component 810 may also perform user identification based on audio received by the user device 110. The audio component 810 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 810 may perform user recognition by comparing audio characteristics representing the audio to stored audio characteristics of users.

Figure 8B:
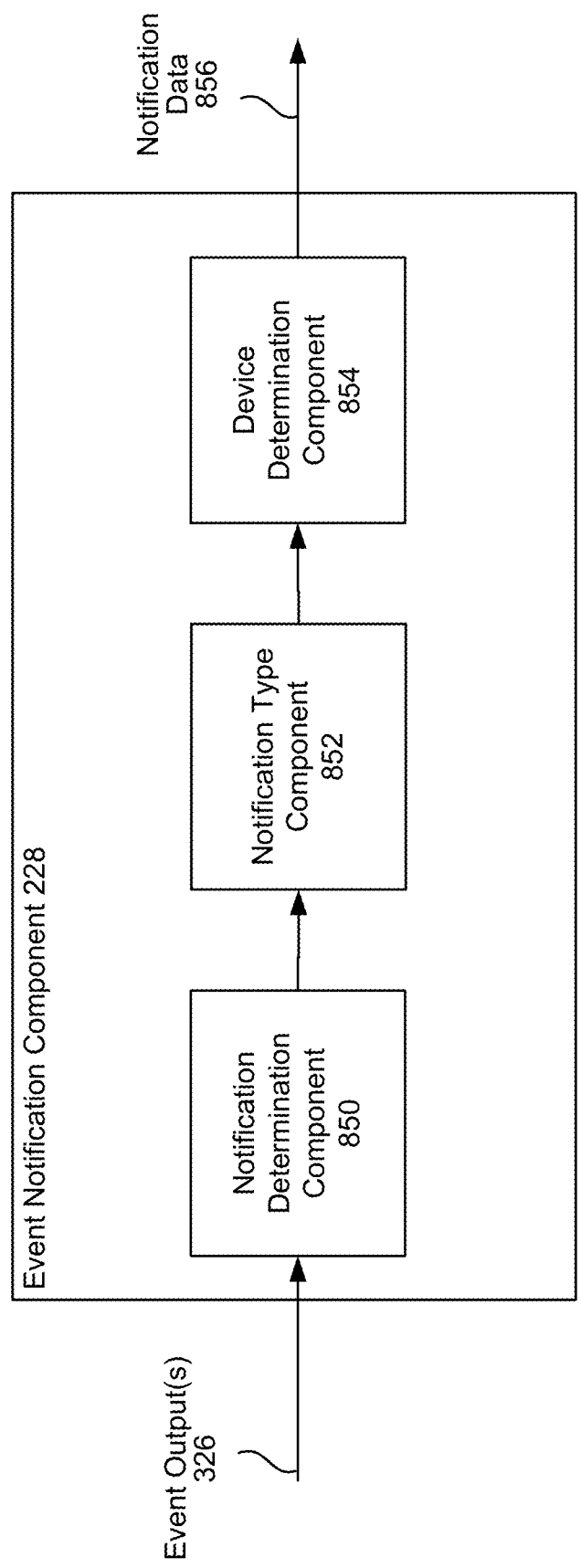
FIG. 8B illustrates an event-notification component according to embodiments of the present disclosure.

As shown in FIG. 8B, the event-notification component 228 may include a notification-determination component 850, a notification-type component 852, and/or a device-determination component 854. The notification-determination component 850 may receive one or more of the event output(s) 326 and determine if a notification corresponding to the event(s) should be sent to one or more device(s). The event output(s) 326 may, for example, indicate a first kind of event, such as glass breaking or a baby crying, and the notification-determination component 850 may determine that a corresponding notification should be sent to a user device. The event output(s) 326 may, on the other hand, indicate a second kind of event, such as a dog bark, and the notification-determination component 850 may determine that no notification may be sent. The notification-determination component 850 may make this determination by determining data identifying the event and determining a corresponding user preference (as stored in, for example, the profile storage 270) for receiving notifications corresponding to the event. That is, a user of the user device may have input a preference for receiving a notification corresponding to a particular event, and the notification-determination component 850 may determine to send a notification based on the preference. In some embodiments, the notification-determination component 850 determines whether or not to send a notification based at least in part on the type of the event. For example, if the event corresponds to a potentially dangerous or rare event, such as glass breaking, the notification-determination component 850 may determine to send the notification.

The notification-type component 852 may determine the type of the notification to be sent. Types of notifications may include text messages, emails, phone calls, push notifications, or other such notifications. Like the notification-determination component 850, the notification-type component 852 may determine the type of the notification based on a user preference stored in the profile storage 270. The notification-type component 852 may similarly determine the type of the notification based on the type of the event, wherein potentially dangerous or rare events may correspond to a first type of notification, such as a phone call, while other types of events may correspond to a second type of notification, such as an email.

A device-determination component 854 may determine which of a potential plurality of user devices should receive the notification(s). In some embodiments, the device-determination component 854 may determine that the notification(s) (e.g., notification data 856) are to be sent to every device associated with a user account stored in the profile storage 270. In other embodiments, the device-determination component 854 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The described system may be used to create various acoustic event detection data for different events as detectable by different devices in different locations. For example, for a same acoustic event, the system may prompt the user to walk through audio capture by several different devices (for example one device in the living room, one device in the kitchen, etc.). The system may instruct the user to cause the event and may capture acoustic data from multiple different devices while the event occurs. The system may use this combined information to form one set of AED configuration data that may be used by multiple devices (e.g., jointly trained AED data goes to each device). Alternatively (or in addition) the system may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The described system may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system may create one set of AED configuration data (e.g., trained AED model) for the acoustic event from a first location and another set of AED configuration data (e.g., trained AED model) for the acoustic event from a second location different from the first location. To do so the system may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110*a* at a particular location, the user may indicate to the system that the new device 110*b* will be located at the same location. The system may then send the appropriate AED configuration data (e.g., AED model(s)) to the new device 110*b* so the new device 110*b* can be configured to recognize the same acoustic events as the older device 110*a*.

Figure 9:
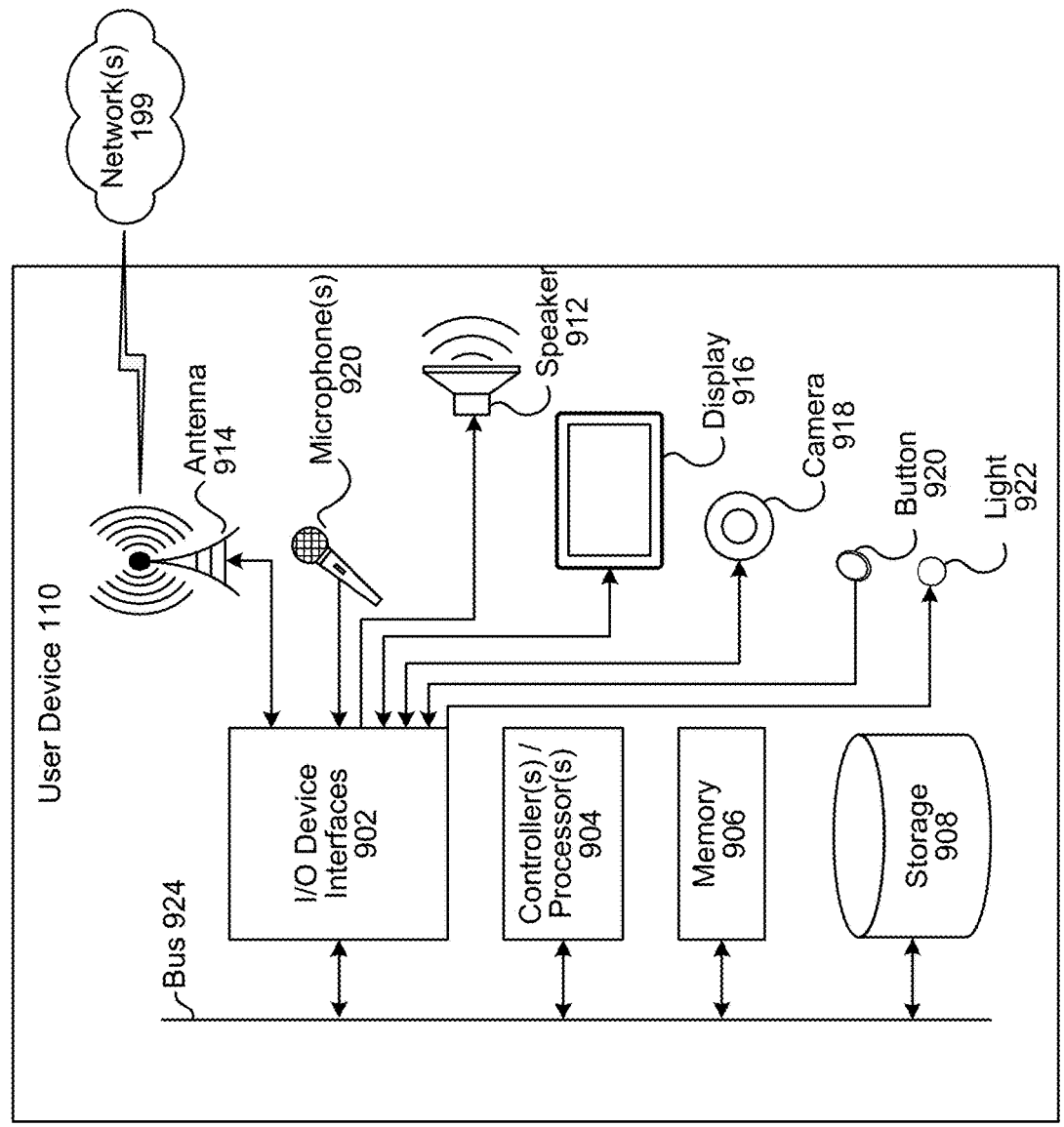
FIG. 9 illustrates example components of a user device according to embodiments of the present disclosure.
Figure 10:
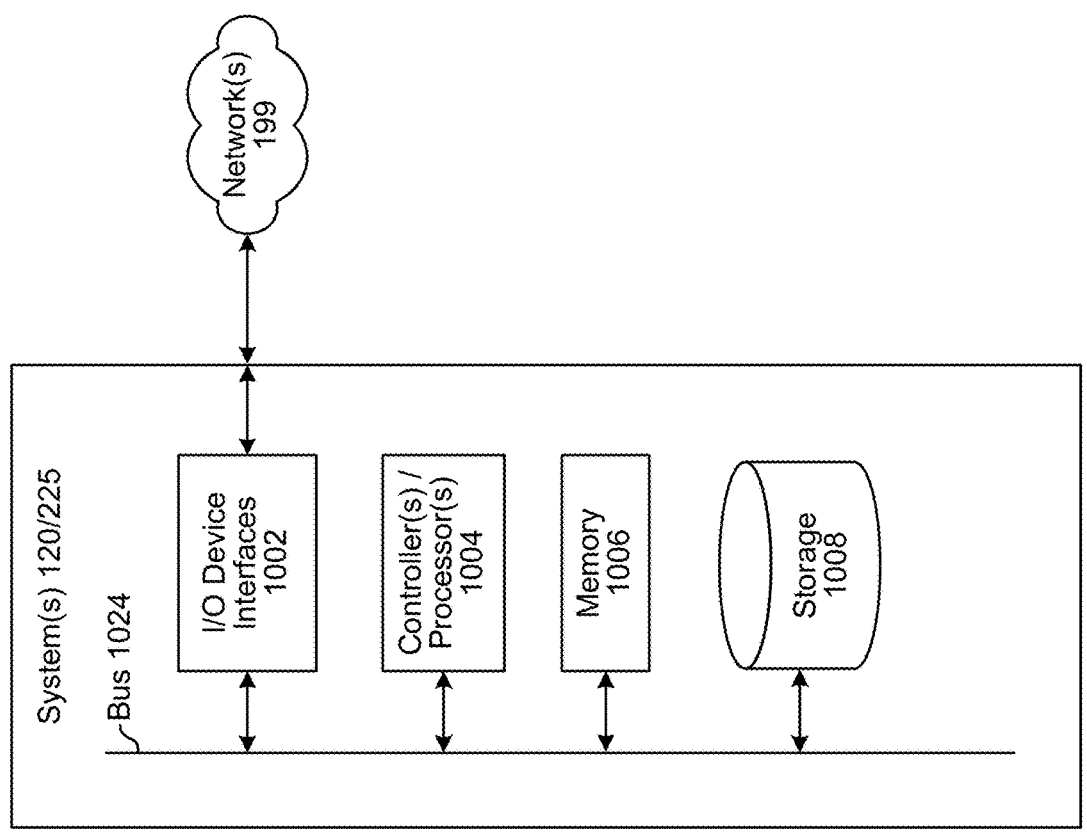
FIG. 10 illustrates example components of a remote system according to embodiments of the present disclosure.

FIG. 9 is a block diagram conceptually illustrating a user device 110 that may be used with the system. FIG. 10 is a block diagram conceptually illustrating example components of a remote device, such as the system(s) 120, which may assist with ASR processing, NLU processing, etc., and the skill system(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill system(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system(s) 120, and the skill system(s) 225, as described herein, are illustrative, and may be located as a stand-alone device or may be included, in whole or in part, as a component of a larger device or system.

Figure 11:
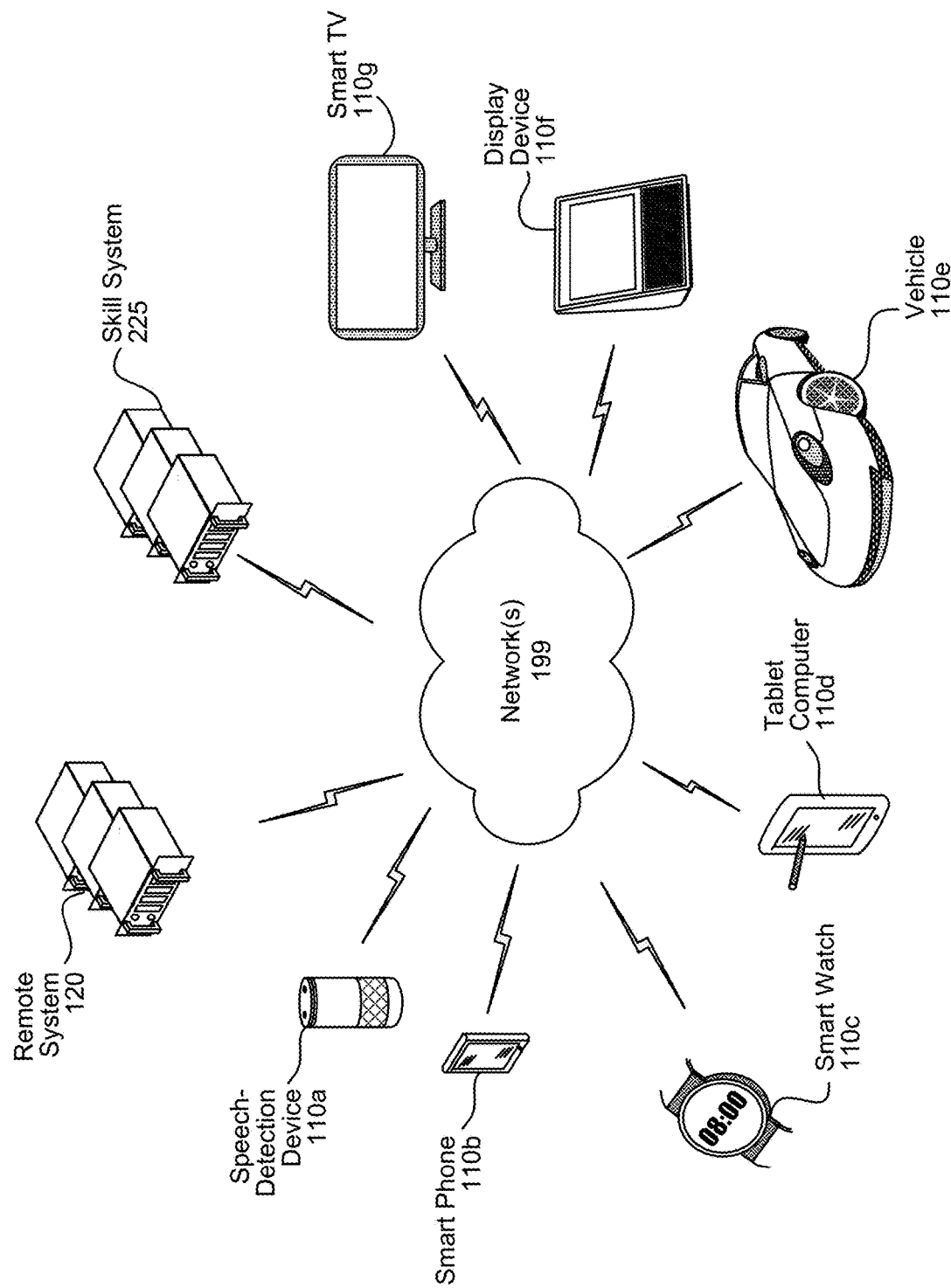
FIG. 11 illustrates an example of a computer network for use with a speech-processing system.

As illustrated in FIG. 11, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a vehicle 110e, a display vehicle 110f, and/or a smart television 110g may be connected to the network(s) 199 through a wireless service provider, over a Wi-Fi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of one or more servers 120.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for detecting an acoustic event, the method comprising:
   receiving, at a user device, first speech audio data representing an utterance;
   determining that the utterance includes a request to detect the acoustic event using the user device;
   outputting, by a second device corresponding to the user device, a first prompt to cause a first sound associated with the acoustic event;
   receiving, at the user device, first event audio data representing the first sound;
   sending, from the user device to at least one remote device, the first event audio data;
   outputting, by the second device, a second prompt to cause a second sound associated with the acoustic event;
   determining, based at least in part on a type of the acoustic event, a time window during which to capture audio data;
   receiving, during the time window and at the user device, second event audio data representing the second sound;
   sending, from the user device to the at least one remote device, the second event audio data;
   instructing the user device to discontinue sending of audio data after expiration of the time window;
   receiving, at the user device from the at least one remote device, first encoded feature data corresponding the acoustic event;
   after receiving the first encoded feature data, receiving, at the user device, first audio data;
   processing, using an encoder of the user device, the first audio data to determine second encoded feature data;
   processing the second encoded feature data with respect to the first encoded feature data to determine output data; and
   determining, using the output data, that the acoustic event is represented in the first audio data.

2. The method of claim 1, further comprising:
   outputting, by the user device, a second request for an action to be performed in response to detection of the acoustic event;
   receiving, at the user device, data corresponding to a first action;
   determining output data corresponding to the second request;
   determining a third device associated with the user device; and
   after determining that the acoustic event was represented in the first audio data, causing the first action to be performed by the third device.

3. The method of claim 1, further comprising:
   receiving, at a remote system, the first event audio data and the second event audio data;
   processing, using a second encoder corresponding to the encoder, the first event audio data to determine first intermediate encoded feature data representing a first feature of the first event audio data;
   processing, using the second encoder, the second event audio data to determine second intermediate encoded feature data representing a second feature of the second event audio data; and
   determining the first encoded feature data by averaging a first value of the first intermediate encoded feature data and a second value of the second intermediate encoded feature data.

4. The method of claim 1, further comprising:
   receiving, at the user device, second audio data;
   receiving, at a second user device, third audio data;
   processing, using the encoder, the second audio data to determine third encoded feature data;
   processing, using a second encoder of the second user device, the third audio data to determine fourth encoded feature data;
   determining that the third encoded feature data lacks a representation of the first encoded feature data;
   determining that the fourth encoded feature data corresponds to the first encoded feature data;
   determining that the third audio data corresponds to a higher signal-to-noise ratio than that of the second audio data; and
   causing output, by the second user device, corresponding to detection of the acoustic event.

5. A computer-implemented method comprising:
- receiving, at a first device, a request to detect an acoustic event;
- determining a second device associated with the first device;
- outputting, using the second device a prompt to cause a first sound associated with the acoustic event;
- receiving, at the first device, first audio data representing the first sound;
- configuring an acoustic event detector in accordance with at least the first audio data;
- after configuring the acoustic event detector, receiving, at the first device, second audio data; and
- determining, using the acoustic event detector, that the second audio data includes a representation of a second sound associated with the acoustic event.

6. The computer-implemented method of claim 5, further comprising:
- determining a value corresponding to a sufficiency of the first audio data to provide reference data for the acoustic event detector;
- determining that the value is less than a threshold;
- outputting a third prompt to cause a fourth occurrence of the acoustic event; and
- receiving, at the first device, fourth audio data representing the fourth occurrence,
- wherein the acoustic event detector is further configured based at least in part on the fourth audio data.

7. The computer-implemented method of claim 5, further comprising:
- prior to receiving the second audio data, determining output data corresponding to the second sound; and
- after determining that the second audio data includes the representation, causing, by the second device, output corresponding to the output data.

8. The computer-implemented method of claim 5, further comprising:
- determining that the acoustic event corresponds to a second acoustic event;
- outputting a second prompt to cause a third sound associated with the second acoustic event; and
- receiving, at the first device, third audio data representing the third sound,
- wherein the acoustic event detector is further configured based at least in part on the third audio data.

9. The computer-implemented method of claim 8, further comprising:
- receiving, at the first device, third audio data;
- determining, using the acoustic event detector, that the third audio data lacks a second representation of a third sound associated with the second acoustic event; and
- after determining that the second audio data includes the representation and after determining that the third audio data lacks the second representation, causing, by the second device, output corresponding to output data.

10. The computer-implemented method of claim 9, wherein determining that the third audio data includes the representation comprises:
- processing the second audio data to determine a feature vector representing an acoustic feature of the second audio data;
- processing, using an encoder, the feature vector to determine a first encoded vector identifying the acoustic event;
- determining a value representing similarity between the first encoded vector and a second encoded vector corresponding to the first audio data; and
- determining that the value satisfies a condition.

11. The computer-implemented method of claim 5, further comprising:
- receiving an indication that the first audio data corresponds to a first location; and
- after determining that the second audio data includes a representation of the second sound, causing a notification to be sent, the notification corresponding to the acoustic event and the first location.

12. The computer-implemented method of claim 5, further comprising:
- receiving, at a second device, third audio data representing the first sound;
- determining a first value corresponding to a first signal-to-noise-ratio of the first audio data;
- determining a second value corresponding to a second signal-to-noise-ratio of the third audio data; and
- determining that the first value corresponds to a higher signal-to-noise-ratio than that of the second value.

13. A computing device comprising:
- at least one processor; and
- at least one memory including instructions that, when executed by the at least one processor, cause the computing device to:
  - receive, at the computing device, a request to detect an acoustic event;
  - determine a second device associated with the computing device;
  - output, using the second device, a prompt to cause a first sound associated with the acoustic event;
  - receive, at the computing device, first audio data representing the first sound;
  - configure an acoustic event detector in accordance with at least the first audio data;
  - after configuring the acoustic event detector, receive, at the computing device, second audio data; and
  - determine, using the acoustic event detector, that the second audio data includes a representation of a second sound associated with the acoustic event.

14. The computing device of claim 13, wherein the at least one memory further includes instructions that, when executed by the at least one processor, further cause the computing device to:
- determine a value corresponding to a sufficiency of the first audio data to provide reference data for the acoustic event detector;
- determine that the value is less than a threshold;
- output a third prompt to cause a fourth occurrence of the acoustic event; and
- receive, at the computing device, fourth audio data representing the fourth occurrence,
- wherein the acoustic event detector is further configured based at least in part on the fourth audio data.

15. The computing device of claim 13, wherein the at least one memory further includes instructions that, when executed by the at least one processor, further cause the computing device to:
- prior to receiving the second audio data, determine output data corresponding to the second sound; and
- after determining that the second audio data includes the representation, cause, by the second device, output corresponding to the output data.

16. The computing device of claim 13, wherein the at least one memory further includes instructions that, when executed by the at least one processor, further cause the computing device to:

determine that the acoustic event corresponds to a second acoustic event;

output a second prompt to cause a third sound associated with the second acoustic event; and receive, at the computing device, third audio data representing the third sound, wherein the acoustic event detector is further configured based at least in part on the third audio data.

17. The computing device of claim 16, wherein the at least one memory further includes instructions that, when executed by the at least one processor, further cause the computing device to:

receive, at the computing device, third audio data;

determine, using the acoustic event detector, that the third audio data lacks a second representation of a third sound associated with the second acoustic event; and after determining that the second audio data includes the representation and after determining that the third audio data lacks the second representation, cause, by the second device, second output corresponding to output data.

18. The computing device of claim 13, wherein the at least one memory further includes instructions that, when executed by the at least one processor, further cause the computing device to:

process the second audio data to determine a feature vector representing an acoustic feature of the second audio data;

process, using an encoder, the feature vector to determine a first encoded vector identifying the acoustic event;

determine a value representing similarity between the first encoded vector and a second encoded vector corresponding to the first audio data; and determine that the value satisfies a condition.

19. The computing device of claim 13, wherein the at least one memory further includes instructions that, when executed by the at least one processor, further cause the computing device to:

receive an indication that the first audio data corresponds to a first location; and after determination of the second audio data including a representation of the second sound, cause a notification to be sent, the notification corresponding to the acoustic event and the first location.

20. The computing device of claim 13, wherein the at least one memory further includes instructions that, when executed by the at least one processor, further cause the computing device to:

receive, at a second device, fourth audio data representing the first sound;

determine a first value corresponding to a first signal-to-noise-ratio of the first audio data;

determine a second value corresponding to a second signal-to-noise-ratio of the fourth audio data; and determine that the first value corresponds to a higher signal-to-noise-ratio than that of the second value.

* * * * *